United States Patent [19]

Okochi et al.

[11] Patent Number: 5,221,125
[45] Date of Patent: Jun. 22, 1993

[54] DEVICE FOR DETECTING AND ELIMINATING ACCUMULATOR FLUID LEAKAGE THROUGH CONTROL VALVE

[75] Inventors: Norihiko Okochi, Nagoya; Yoshihisa Nomura; Susumu Masutomi, both of Toyota, all of Japan

[73] Assignee: Toyota Jidosha Kabushiki Kaisha, Toyota, Japan

[21] Appl. No.: 711,651

[22] Filed: Jun. 6, 1991

[30] Foreign Application Priority Data

Jun. 7, 1990 [JP] Japan .................. 2-149551

[51] Int. Cl.⁵ .............................. B60T 8/32
[52] U.S. Cl. .................. 303/10; 188/151 A; 303/92; 303/100; 303/113.3; 303/113.4; 303/116.1; 303/119.2; 303/DIG. 4
[58] Field of Search ............... 303/92, 100, 113 TR, 303/113 TB, 84.1, 84.2, 10–12, 116 R, 119 R, 119 SV, DIG. 3, DIG. 4, 113 R; 188/1.11, 151 A; 137/238, 242, 244, 551; 138/30; 60/413, 415; 340/453; 364/426.01

[56] References Cited

U.S. PATENT DOCUMENTS

| | | | |
|---|---|---|---|
| 3,813,130 | 5/1974 | Inada | 303/115 PP |
| 3,940,020 | 2/1976 | McCrory et al. | 222/52 |
| 3,963,276 | 6/1976 | Atkins | 303/115 PP |
| 3,981,543 | 9/1976 | Atkins | 303/115 PP |
| 4,077,427 | 3/1978 | Rosan, Jr. et al. | 137/551 |
| 4,092,853 | 6/1978 | Schneider et al. | 303/92 X |
| 4,192,180 | 3/1980 | Gerstenmeier et al. | 303/92 X |
| 4,240,672 | 12/1980 | Tokunaga et al. | 303/92 |
| 4,316,641 | 2/1982 | Weise et al. | 303/92 |
| 4,357,054 | 11/1982 | Leiber | 303/DIG. 4 |
| 4,421,361 | 12/1983 | Arikawa et al. | 303/115 PP |
| 4,523,791 | 6/1985 | Belart et al. | 303/92 |
| 4,550,954 | 11/1985 | Leiber | 303/DIG 4 X |
| 4,555,144 | 11/1985 | Belart et al. | 303/92 |
| 4,618,189 | 10/1986 | Nakanishi et al. | 303/115 PP |
| 4,640,555 | 2/1987 | Bertling et al. | 303/11 X |
| 4,728,156 | 3/1988 | Burgdorf et al. | 303/92 |
| 4,736,992 | 4/1988 | Hendrickson | 307/92 |
| 4,753,492 | 6/1988 | Leiber et al. | 303/92 |
| 4,775,195 | 10/1988 | Miller | 303/92 |
| 4,789,938 | 12/1988 | Maehata et al. | 303/92 |
| 4,818,039 | 4/1989 | Bertling et al. | 303/10 X |
| 4,824,183 | 4/1989 | Uchida et al. | 303/92 |
| 4,832,418 | 5/1989 | Mattusch | 303/92 X |
| 4,834,469 | 5/1989 | Kohno et al. | 303/92 X |
| 4,869,558 | 9/1989 | Yoshino | 303/92 |
| 4,880,282 | 11/1989 | Makino et al. | 303/92 X |
| 4,895,416 | 1/1990 | Tozu et al. | 303/92 |
| 4,919,496 | 4/1990 | Burgdorf et al. | 303/10 X |
| 4,953,092 | 8/1990 | Higashimura | 303/92 X |
| 5,000,520 | 3/1991 | Schmitt | 303/DIG. 3 |
| 5,013,097 | 5/1991 | Gutzeit et al. | 303/116 R |
| 5,015,043 | 5/1991 | Resch | 303/10 X |
| 5,026,124 | 6/1991 | Resch | 303/92 X |
| 5,039,175 | 8/1991 | Holzmann et al. | 303/92 |
| 5,051,063 | 9/1991 | Vasselet | 303/59 X |

FOREIGN PATENT DOCUMENTS 62-149547 7/1987 Japan .
3-213701 9/1991 Japan .

*Primary Examiner*—Douglas C. Butler
*Attorney, Agent, or Firm*—Cushman, Darby & Cushman

[57] ABSTRACT

A fluid leakage preventing device incorporated in a hydraulically-operated system which includes an accumulator for storing a working fluid under pressure, an actuator operated by the fluid supplied from the accumulator, and a control valve having an open position and a closed position for fluid communication and disconnection between the accumulator and the actuator, respectively. The fluid leakage preventing device includes a fluid leakage detector for generating an output signal indicative of the leakage flow of the fluid from said accumulator through the control valve placed in the closed position. The device further includes a valve reciprocating arrangement responsive to the output signal of said fluid leakage detector, for effecting at least one reciprocating movement of a valving member of the control valve.

28 Claims, 17 Drawing Sheets

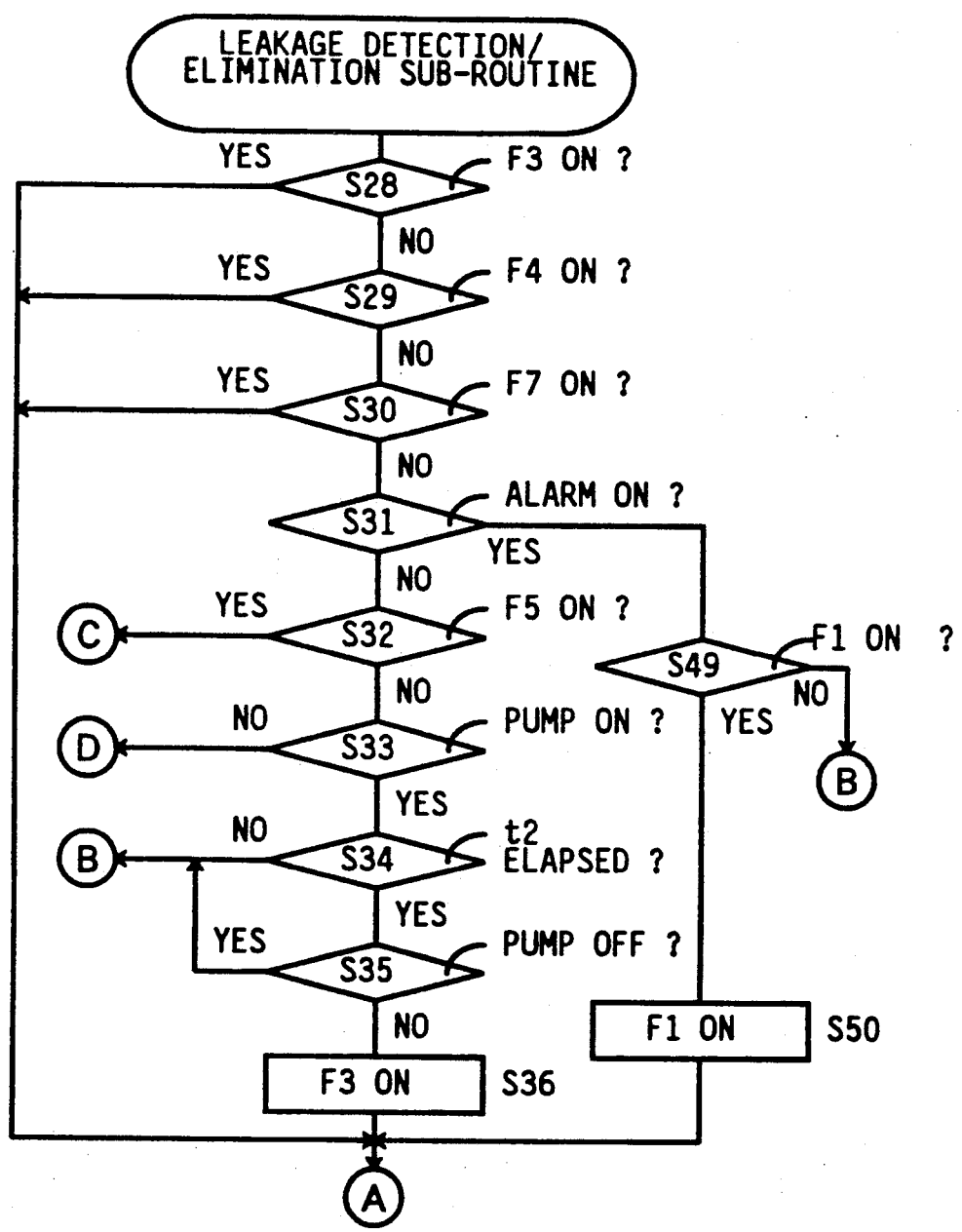

FIG. 9

| RAM | 148 |
|---|---|
| SOLENOID FLAG | Fsol |
| INITIAL INHIBIT TIME FLAG | F1 |
| t1 MEASURING FLAG | F2 |
| LEAKAGE DETECTION FLAG | F3 |
| LEAKAGE DETECTION FLAG | F4 |
| t3 MEASURING FLAG | F5 |
| COIL ENERGIZATION FLAG | F6 |
| LEAKAGE DETECTION FLAG | F7 |
| TIMER | 150 |
| TIMER | 152 |
| TIMER | 154 |
| COUNTER | 156 |
| ANTI-LOCK CONTROL FLAG | $F_A$ |
| TRACTION CONTROL FLAG | $F_T$ |
| VALVE RECIPROCATION FLAG | F8 |

FIG. 16

| RAM | 148 |
|---|---|
| CURRENT PRESSURE REGISTER | 206 |
| LAST PRESSURE REGISTER | 208 |
| PRESSURE RISE RATE REGISTER | 210 |
| PRESSURE DROP RATE REGISTER | 212 |
| LEAKAGE DETECTION FLAG | F10 |
| LEAKAGE DETECTION FLAG | F11 |

DEVICE FOR DETECTING AND ELIMINATING ACCUMULATOR FLUID LEAKAGE THROUGH CONTROL VALVE

BACKGROUND OF THE INVENTION

1. Field of the Invention

The present invention relates to a device for detecting and eliminating leakage of a working fluid from a hydraulic accumulator, through a control valve which has an open and a closed position for fluid communication and disconnection between the accumulator and an actuator to be operated by the pressure of the fluid.

2. Discussion of the Related Art

A leakage flow of a working fluid from a control valve causes a problem in a hydraulically-operated brake system for a motor vehicle as disclosed in laid open Publication No. 3-213701 of unexamined Japanese Patent Application 2-5736. This hydraulic brake system, which is adapted to be used for a four-wheel motor vehicle, has an anti-lock brake pressure regulating function and a wheel traction control function. The brake system is equipped with an accumulator storage pressure sensor for holding the storage pressure of an accumulator (hereinafter referred to simply as "accumulator pressure") within an optimum range, and an accumulator alarm pressure sensor for detecting an abnormal drop of the accumulator pressure and providing an alarm. When the accumulator pressure falls below the lower limit of the optimum range due to a supply flow of the fluid from the accumulator, the accumulator storage pressure sensor generates an output signal to activate a hydraulic pump for raising the accumulator pressure up to the upper limit of the optimum range. In the event that the hydraulic pump fails to operate in response to the output signal of the accumulator storage pressure sensor, for some reason or other, the accumulator alarm pressure sensor generates an output signal to provide a suitable alarm when the accumulator pressure falls below a predetermined reference level, which indicates an abnormal drop of the accumulator pressure.

In the hydraulic brake system described above, a solenoid-operated directional control valve is provided between the accumulator, and the actuator in the form of a wheel brake cylinder for applying brake to a vehicle wheel. This directional control valve is used for the brake system to effect the traction control of the relevant wheel. The directional control valve has a first position for fluid communication between the wheel brake cylinder and the accumulator while disconnecting the wheel brake cylinder from the reservoir, and a second position for fluid communication between the wheel brake cylinder and the reservoir while disconnecting the cylinder from the accumulator. During use of the directional control valve, foreign matters may be caught between the valving member and the valve seat, preventing the valving member from being correctly seated on the valve seat for establishing the second position. In this event, the working fluid may leak from the accumulator into the reservoir through the directional control valve, even when the valve is commanded to be placed in the second position for disconnection of the wheel brake cylinder from the accumulator. In this case, too, the accumulator pressure is regulated according to the output signal of the accumulator storage pressure sensor, and an alarm is constituted based on the output signal of the accumulator alarm pressure sensor.

However, the hydraulically operated brake system of the type described above is not adapted to eliminate the trouble with the solenoid-operated directional control valve, that is, not equipped with means for eliminating the incomplete disconnection of the accumulator from the reservoir by the valve. Consequently, once the trouble happens with the directional control valve, the fluid continues to leak into the reservoir through the directional control valve, until the valve is operated again. In the presence of the continuing fluid leakage, it takes a considerably long time for the pump to raise the accumulator pressure to within the optimum range, and the accumulator pressure tends to be rapidly lowered below the lower limit.

The above-indicated defect of the solenoid-operated directional control valve results in increasing the energization time of the pump motor and the associated relay, or the number of energization of these electric components, leading to shortening the life expectancy of the electric components, and wasting of the electric energy.

The above problem exists not only in the hydraulically-operated brake system of the type indicated above, but also in a hydraulically operated system in general, which employs a control valve such as a directional control valve or a shut-off valve, and a hydraulic accumulator for storing a working fluid under pressure.

SUMMARY OF THE INVENTION

It is therefore an object of the present invention to provide an accumulator leakage preventing device which is capable of detecting leakage of a working fluid from an accumulator through a control valve, and eliminating or stopping the leakage of the fluid.

The above object may be achieved according to the principle of the present invention, which provides a fluid leakage preventing device incorporated in a hydraulically-operated system which includes an accumulator for storing a working fluid under pressure, an actuator operated by the fluid supplied from the accumulator, and a control valve having an open position and a closed position for fluid communication and disconnection between the accumulator and the actuator, respectively, the present fluid leakage preventing device comprising (a) fluid leakage detecting means for generating an output signal indicative of a leakage flow of the fluid from the accumulator through the control valve placed in the closed position; and (b) valve reciprocating means responsive to the output signal of the fluid leakage detecting means, for effecting at least one reciprocating movement of a valving member of control valve (58). Thus, the present device is capable of detecting and eliminating the leakage flow of the fluid from the accumulator through the control valve placed.

In the leakage fluid preventing device constructed according to the principle of the present invention as described above, the fluid leakage detecting means generates the output signal when the leakage flow of the fluid from the accumulator through the control valve occurs. In response to this output signal, the valve reciprocating means is activated to effect one or more reciprocating movements of the valving member of the control valve. As a result, if the fluid leakage occurs due to improper seating of the valving member on a valve seat, the reciprocation of the valving member permits the valving member to be properly seated on the valve seat so as to assure complete closure of the control valve. If the fluid leakage occurs due to foreign matters caught between the valving member and the valve seat, the reciprocation of the valving member causes the foreign matters to be washed away due to the fluid flow through the control valve, or compacted or crushed between the valving member and the valve seat due to abutting contact of the valving member against the valve seat. Thus, the abnormal condition of the control valve which causes the detected fluid leakage through the control valve can be effectively eliminated.

It will be understood that the present device is capable of preventing the leakage of the working fluid from the accumulator, and therefore effective to reduce the number of operations of the pump motor and the associated relay for maintaining the fluid pressure in the accumulator within the preset optimum. Without the present device incorporated in the hydraulically-operated system the fluid leakage from the accumulator would result in frequent operation of such electrical components to maintain the accumulator pressure within the optimum range. In this respect, the present device assures increased life expectancy of the electrical components and reduced wasting of electric energy consumed by the hydraulically-operated system.

Further, the fluid leakage detecting means and the valve reciprocating means may be readily available with a relatively small increase in the cost of the system, by merely adding simple electronic control circuitry or modifying the control program stored in an existing computer used for controlling the system.

BRIEF DESCRIPTION OF THE DRAWINGS

The above optional objects, features and advantages of the invention will be better understood by reading following detailed description of presently preferred embodiments of the invention, when considered in connection with the accompanying drawings, in which:

FIGS. 8A, 8B and 8C are a flow chart of a leakage detection/elimination sub-routine of the accumulator leakage preventing routine;

FIG. 9 is a view schematically showing a random-access memory of the control device;

FIG. 16 is a view schematically showing a random-access memory of the control device of FIG. 13.

DETAILED DESCRIPTION OF THE PREFERRED EMBODIMENTS

Figure 1:
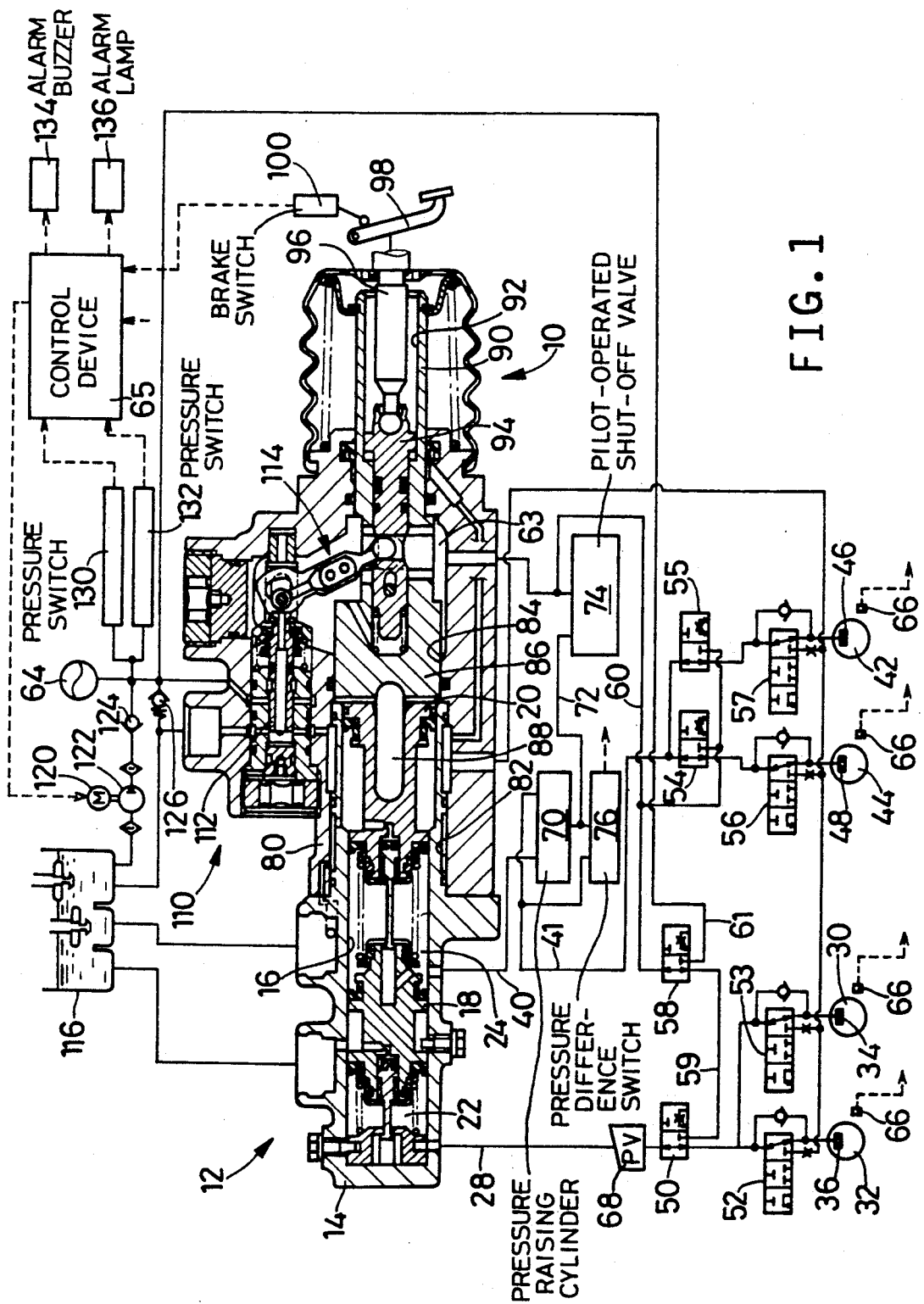
FIG. 1 is a diagrammatic view partly in cross section of a hydraulically-operated brake system having anti-lock and traction control functions for a four-wheel motor vehicle, which system is equipped with a device for preventing fluid leakage from an accumulator of the system constructed according to one embodiment of this invention.

Referring first to FIG. 1, reference numeral 10 denotes a hydraulic booster used in an anti-lock/traction control type hydraulically-operated brake system for a four-wheel motor vehicle, which is equipped with an accumulator leakage preventing device constructed according to one embodiment of the present invention. In the same figure, reference numeral 12 denotes a tandem type master cylinder. In a housing 14 of the master cylinder 12, there are fluid-tightly and slidably received a first pressure piston 18 and a second pressure piston 20. These two pressure pistons 18, 20 cooperate with the housing 14 to define a first pressure chamber 22 and a second pressure chamber 24, which are formed in front of the pistons 18, 20, respectively. A pressure of a working fluid in the first pressure chamber 22 is applied through a fluid passage 28 to left and right rear wheel brake cylinders 34, 36 of left and right rear wheels 30, 32 of the vehicle, while a pressure of the fluid in the second pressure chamber 24 is applied through fluid passages 40, 41 to left and right front wheel brake cylinders 46, 48 of left and right front wheels 42, 44 of the vehicle.

Between the rear wheel brake cylinders 34, 36 and the first pressure chamber 22, there are disposed a solenoid-operated directional control valve 50 and two solenoid-operated pressure control valves 52, 53. Between the front wheel brake cylinders 46, 48 and the second pressure chamber 24, there are disposed two solenoid-operated directional control valves 54, 55 and two solenoid-operated pressure control valves 56, 57. The directional control valve 50 is connected to a power chamber 63 in the booster 10, through a solenoid-operated directional control valve 58, so that the rear wheel brake cylinders 34, 36 are supplied with the pressure generated in the master cylinder 12, or the pressure in the power chamber 63. The directional control valves 54, 55 are also connected to the power chamber 63, so that the front wheel brake cylinders 46, 48 are supplied with the pressure in the master cylinder 12, or the pressure in the power chamber 63.

Figure 2:
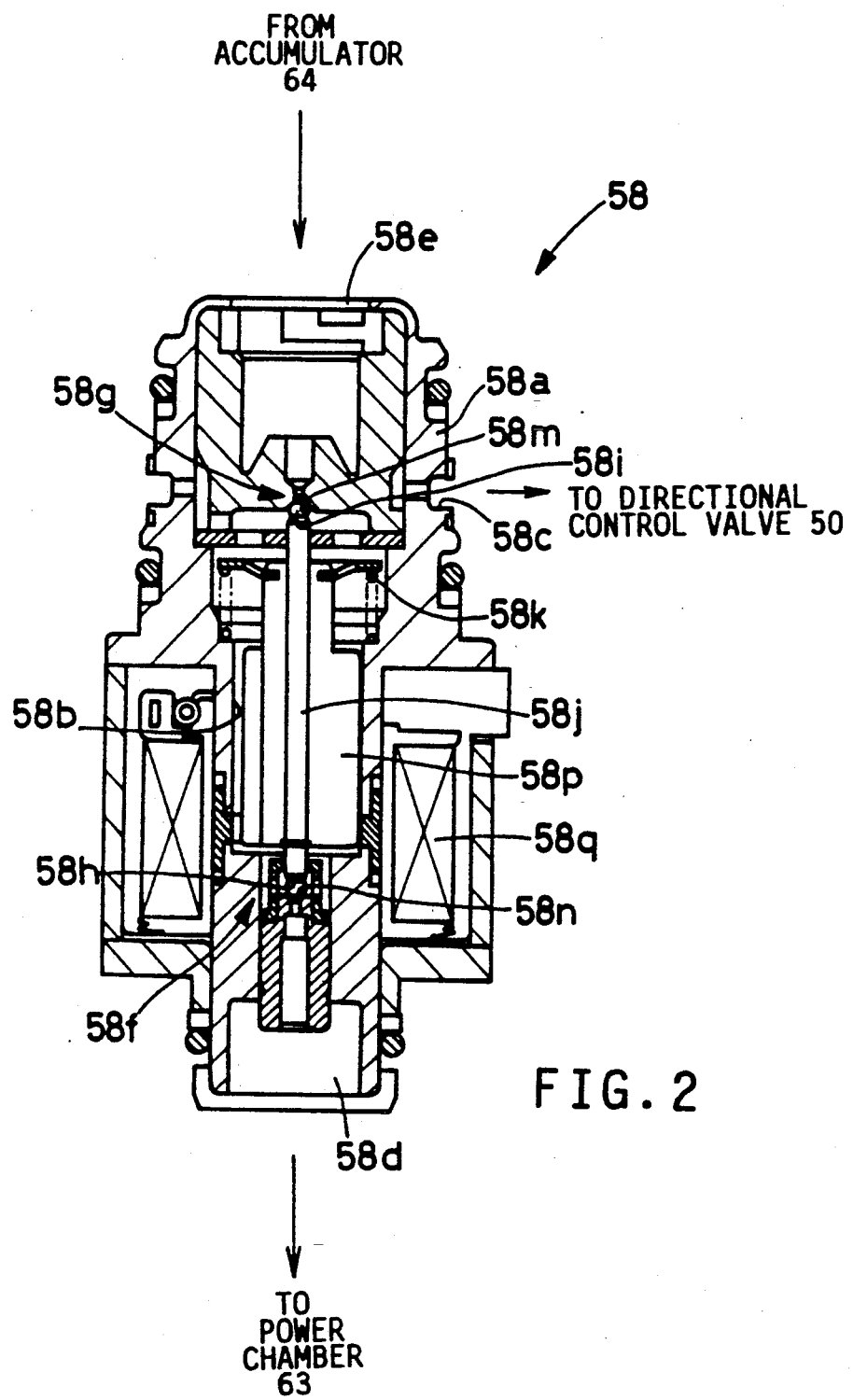
FIG. 2 is a front elevational view in cross section of a solenoid-operated directional control valve used in the brake system of FIG. 1.

Referring next to FIG. 2, the solenoid-operated directional control valve 58 includes a housing 58a which has a valve chamber 58b formed in an axial direction thereof, and three ports 58c, 58d and 58e which communicate with the valve chamber 58b. The port 58c communicates with the directional control valve 50 through a fluid passage 59, while the ports 58d and 58e communicate with the power chamber 63 and an accumulator 64 through respective fluid passages 60, 61. A shut-off valve 58f is provided between the port 58d and the valve chamber 58b, while a shut-off valve 58g is provided between the port 58e and the valve chamber 58b.

Within the valve chamber 58b, a valving member 58j slidable in the axial direction is contained. The valving member 58j has opposite operating ends 58h, 58i and is biased by a spring 58k such that the operating end 58i is seated on a valve seat 58m to close the shut-off valve 58g, while the operating end 58h is spaced from a valve seat 58n to open the shut-off valve 58f. In this condition of the directional control valve 58, the power chamber 63 communicates with the directional control valve 50, through the fluid passage 60, port 58d, valve chamber 58b, port 58c and fluid passage 59.

An armature 58p is fixed to the circumferential surface of the valving member 58j, while a solenoid coil winding 58q is retained by the housing 58a. With the coil winding 58q energized with an electric current, the valving member 58j is moved in the valve chamber 58b against the biasing action of the spring 58k, to thereby close the shut-off valve 58f with the operating end 58h seated on the valve seat 58n, while holding the shut-off valve 58g in the open position. As a result, the power chamber 63 is disconnected from the directional control valve 50, while the accumulator 64 is connected for fluid communication with the directional control valve 50. This switching operation of the directional control valve 58 is effected when the traction of the rear wheels 30, 32 is controlled. In this traction control position of the directional control valve 58, the pressurized working fluid (brake fluid) stored in the accumulator 64 is supplied to the directional control valve 50 through the fluid passage 61, port 58d, valve chamber 58b, port 58c and fluid passage 59, whereby the rear wheel brake cylinders 34, 36 are supplied with the pressurized brake fluid from the accumulator 64.

The operations of the solenoid-operated directional control valves 50, 54, 55, 58 and pressure control valves 52, 53, 56, 57 are controlled by a control device 65 which will be described. Each of the pressure control valves 52, 53, 56, 57 has three positions for effecting anti-lock brake pressure regulating operations for all of the four wheel brake cylinders 34, 36, 46, 48 of the four wheels 30, 32, 42, 44, and for effecting the above-indicated traction control operation for the wheel brake cylinders 34, 36 of the left and right rear wheels 30, 32, which are drive wheels as distinguished from the idler front wheels 42, 44. In the anti-lock brake pressure regulation, the rotating speed of each wheel 30, 32, 43, 44 is detected by a corresponding speed sensor 66, and the corresponding pressure control valve 52, 53, 56, 57 is controlled according to the output signal of the speed sensor 66, so as to increase, hold and decrease the brake pressure in the relevant wheel cylinder 34, 36, 46, 48, for maintaining the amount of slip of each wheel within an optimum range. Since this anti-lock brake pressure regulating operation is well known in the art, no further description will be provided herein. In the traction control operation, the brake pressure in each drive wheel 34, 36 is regulated so as to control the drive force of the wheel for preventing an excessive slip of the wheel while the wheel is accelerated. In FIG. 1, reference numeral 68 denotes a proportioning valve disposed between the first pressure chamber 22 and the solenoid-operated directional control valve 54.

Between the second pressure chamber 24 and the directional control valves 54, 55, there is disposed a pressure raising 70. Between this cylinder 70 and the power chamber 63 of the booster 10, there is connected a pilot-operated shut valve 74 through a fluid passage 72 and the fluid 60 indicated above. Further, the fluid passage 41 is to the fluid passage 72 through a pressure different 76. While the pressure in the power chamber 63 normal, the pilot-operated shut-off valve 74 is in the closed position, whereby the reduction in the voltage of a raising chamber of the pressure raising cylinder 70 is inhibited, to disable the pressure raising cylinder 70. As a result, the pressure of the second pressure chamber 24 is supplied to the fluid passage 41, without a rise of the pressure by the cylinder 70, as long as the pressure in the power chamber 63 is normal. In this condition the pressure difference switch 76 is not activated since the pressure in the fluid passage 41 is equal to that in the fluid passage 72. When the pressure in the power chamber 63 is abnormally low, the pilot-operated shut-off valve 74 is opened, whereby the pressure raising cylinder 70 is operated to raise the pressure received from the second pressure chamber 24, and the raised pressure is applied to the fluid passage 41. Since the pressure in the fluid passage 41 is higher than that in the fluid passage 72, in this conduit the pressure difference switch 76 is operated to generate an output signal indicating that the pressure in the power chamber 63 is abnormal. An arrangement including the pressure raising cylinder 70, pilot-operated shut-off valve 74 pressure difference switch 76 is disclosed in laid open Publication No. 62-149547 of unexamined Japanese Patent Application No. 61-172568 which was published before the filing date of the present application.

The housing 14 of the master cylinder 12 is fitted at one end thereof an end portion 82 of a cylinder bore 84 formed in a housing 80 of the booster 10, so that the cylinder bore 84 communicates with the cylinder bore 16 formed through the master cylinder 12. The cylinder bore 84 fluid-tightly and slidably receives a power piston 86, such that the power piston 86 and the second pressure piston 20 are coaxial or concentric with each other, and so that an operating force acting on the power piston 86 is transmitted to the second pressure piston 20 through a relay rod 88. The rear end face of power piston 86 partially defines the power chamber 63 within the cylinder bore 84. The power piston 86 includes a small-diameter portion 90 having a blind hole 92 which contains a reaction piston 94 which is slidable and fluid-tight. To the reaction piston 94, there is fixed an input rod by calking at its front end. The input rod 96 is linked at its rear end to a brake operating member in the form of a pedal 98. An operation of the brake pedal 98 is sensed a brake switch 100. An output signal of the brake switch is applied to the control device 65.

The booster 10 further includes a control valve 110 having a valve spool 112 which is linked with the power and reaction pistons 86, 94 by means of a lever device 114. In this arrangement of the booster 10, the fluid pressure corresponding to an operating force applied to the input rod 96 is generated in the power chamber 63 and is applied to the power piston 86.

Figure 3:
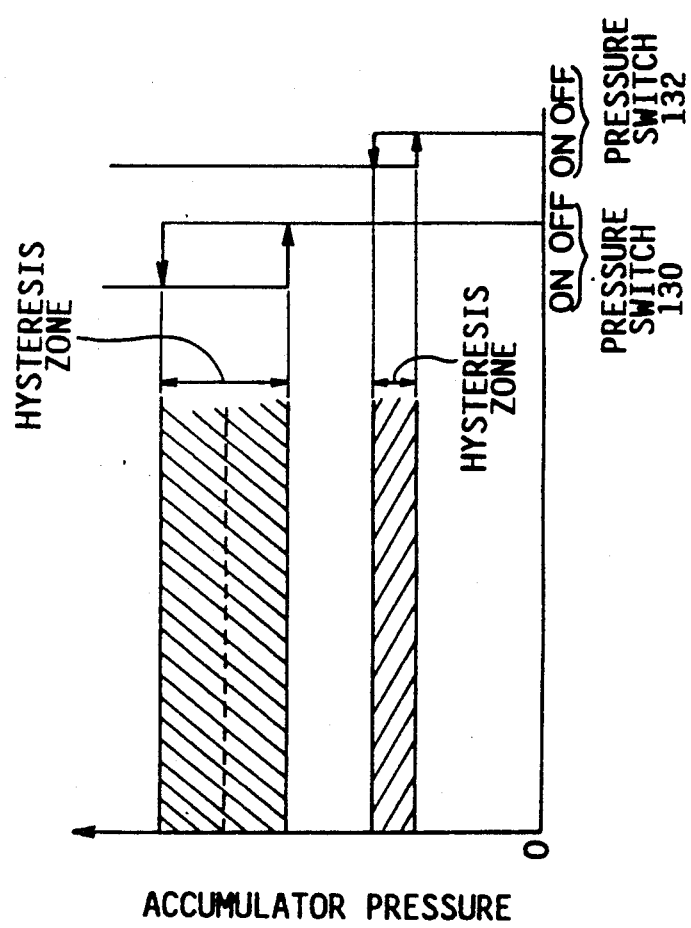
FIG. 3 is a graph indicating operating characteristics of pressure switches provided in the accumulator leakage preventing device.

The brake system has a reservoir 116 for storing the brake fluid, which is pressurized by pressurizing means in the form of a pump 122 operated by a pump motor 120. The pressurized fluid is stored in the accumulator 64 through a fluid passage, which incorporates a check valve 124 for inhibiting a flow of the fluid from the accumulator 64 toward the pump 122. The accumulator 64 is provided with a relief valve 126 which functions to prevent an excessive rise of the fluid pressure in the accumulator 64 (accumulator pressure). The accumulator 64 is provided also with two pressure switches 130, 132, whose operating characteristics are indicated in the graph of FIG. 3. It will be understood from the graph that the two pressure switches 130, 132 have predetermined respective different hysteresis zones. More specifically, the first pressure switch 130 is used to control the pump motor 120, so as to maintain the accumulator pressure within a predetermined optimum range, while the second pressure switch 132 is used to detect an excessive or abnormal drop of the accumulator pressure below a predetermined level which is lower than the lower limit of the optimum range. When the abnormal drop of the accumulator pressure is detected, the second pressure switch 132 produces a signal to activate an alarm buzzer 134 and an alarm lamp 136, for informing the vehicle driver of the presence of the abnormal drop.

Figure 4:
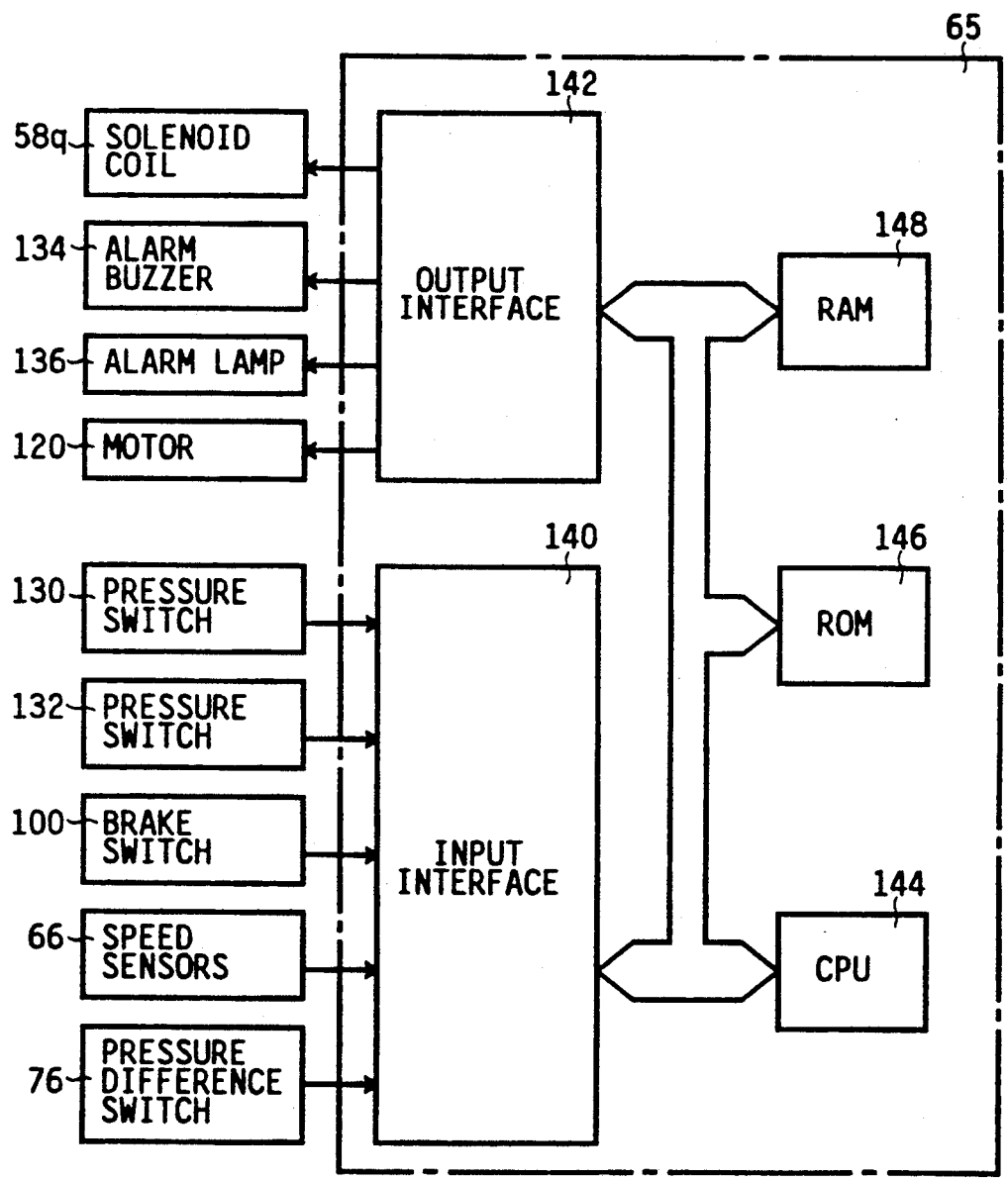
FIG. 4 is a schematic block diagram showing a control device of the brake system.

The pressure switches 130, 132, and the alarm buzzer and lamp 134, 136 are connected to the control device 65 indicated above. The control device 65 is principally constituted by a computer, and incorporates an input interface 140, an output interface 142, a CPU (central processing unit) 144, a ROM (read-only memory) 146 and a RAM (random-access memory) 148, as indicated in FIG. 4. The input interface 140 receives the output signals of the speed sensors 66, pressure difference switch 76, brake switch 100 and pressure switches 130, 132, while the output interface 142 are connected to the solenoid coil winding 58q of the solenoid-operated directional control valve 58 (as well as the coil windings of the other solenoid-operated directional or pressure control valves 50, 54, 55, 52, 53, 56, 57), pump motor 120, and alarm buzzer and lamp 134, 136. The ROM 146 stores various control programs such as the anti-lock brake pressure regulating program (not shown), wheel traction control program (not shown), and accumulator pressure control program as illustrated in the flow charts of FIGS. 5, 6, 7 and 8. The RAM 148 has data storage areas for storing various kinds of data such as a SOLENOID flag Fsol, as indicated in FIG. 9.

The control device 65 is adapted to control the following operations: (a) operations to control the brake pressures in the wheel brake cylinders 34, 36, 46, 48 in an anti-lock manner, and control the brake pressures in the brake cylinders 34, 36 for controlling the traction forces of the drive wheels 30, 32; (b) operation to control the pump motor 120 for maintaining the accumulator pressure within the predetermined optimum range, in response to the output signal of the pressure switch 130; (c) operations to control the alarm buzzer and lamp 134, 136 in response to the output signal of the pressure switch 132; and (d) operations to activate the solenoid-operated directional control valve 58 for two or more reciprocating movements of the valving member 58j, according to the control program of FIGS. 5-8, when a leakage flow of the fluid from the accumulator 64 is detected based on the output signals of the pressure switches 130, 132.

The present brake system is characterized by the arrangement for effecting the operations indicated at (d) above, which will be described in detail.

The shut-off valve 58g of the solenoid-operated directional control valve 58 is normally placed in the closed position in which the accumulator 64 is disconnected from the reservoir 116. If any foreign substance is caught between the operating end 58i of the valving member 58j of the shut-off valve 58g and the valve seat 58m, the shut-off valve 58g cannot be completely closed, and the accumulator 64 may communicate with the power chamber 63 through the partially open shut-off valve 58g, and through the shut-off valve 58f placed in the open position. In this event, the accumulator 64 communicates with the reservoir 116 through the power chamber 63, causing the fluid to leak from the accumulator 64 into the reservoir 116. A similar leakage of the accumulator 64 occurs when the opening end 58i cannot be properly seated on the valve seat 58m. The instant embodiment of the invention is adapted to detect and eliminate such leakage flow of the fluid from the accumulator 64 through the defective directional control valve 58.

Figure 5:
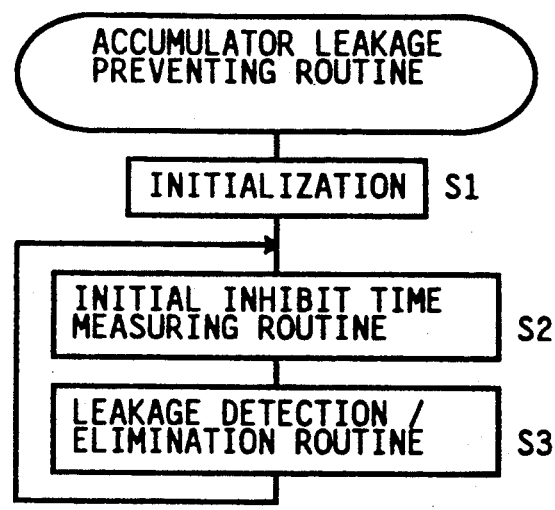
FIG. 5 is a flow chart illustrating an accumulator leakage preventing routine which is stored as part of control programs in a read-only memory of the control device.
Figure 6:
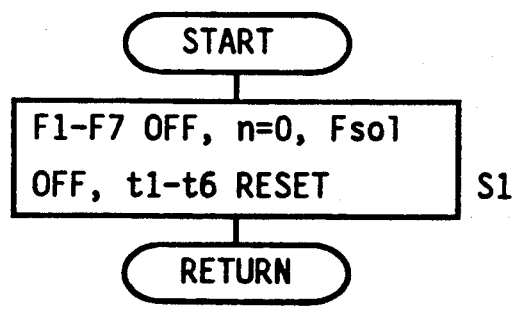
FIG. 6 is a flow chart of an initialization sub-routine of the accumulator leakage preventing routine.

Reference is now made to the flow charts of FIGS. 5-8. The flow chart of FIG. 5 shows an accumulator leakage preventing main routine with a cycle time of 20 msec. Initially, step S1 is implemented to initialize the control device 65, namely, to turn OFF various flags of the RAM 148, such as the SOLENOID flag Fsol, as indicated in the flow chart of FIG. 6. With this flag reset to the OFF state, the coil winding 58q of the solenoid-operated directional control valve 58 is de-energized to place the shut-off valve 58g of the valve 58 in the closed position. Step S1 is followed by step S2 to execute an initial inhibit time measuring sub-routine. Finally, step S3 is implemented to execute a leakage detection/elimination sub-routine.

Figure 7:
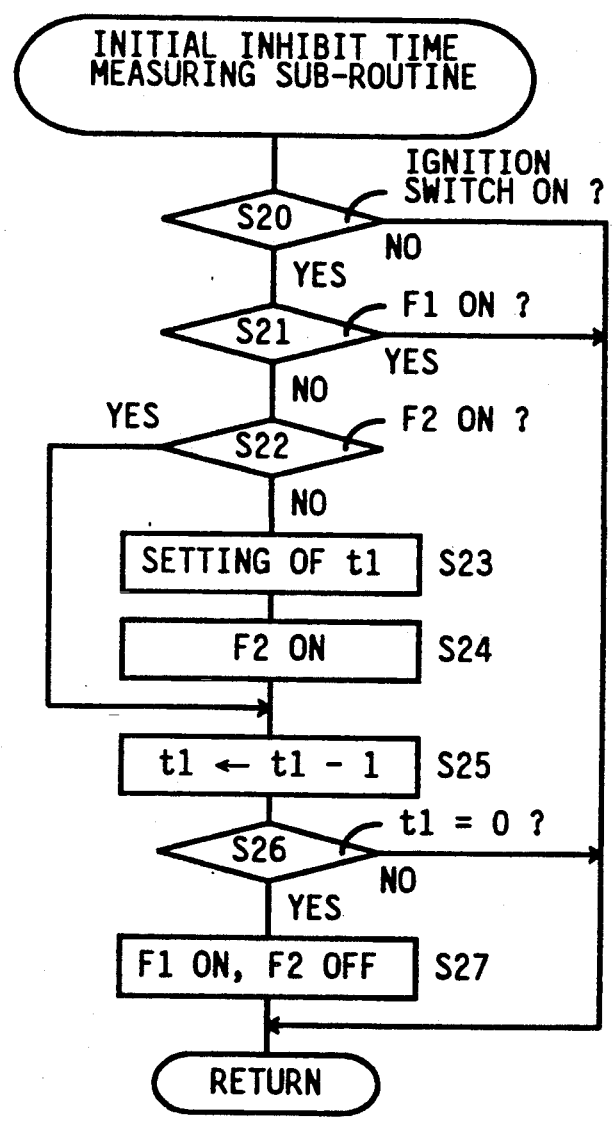
FIG. 7 is a flow chart of an initial inhibit time measuring sub-routine of the accumulator leakage preventing routine.

The initial inhibit time measuring sub-routine (step S2 in the main routine of FIG. 5), which is illustrated in FIG. 7, is provided to prevent execution of the leakage detection/elimination sub-routine of step S3 of the main routine, for a predetermined initial time period after the starting of the vehicle engine.

When the vehicle engine is started with an ignition switch turned ON, an affirmative decision (YES) is obtained in step S20 of the initial inhibit time measuring sub-routine of FIG. 7. As a result, the control flow goes to step S21 to determine whether an INITIAL INHIBIT TIME flag F1 is ON or not. Since this flag F1 is not initially ON, a negative decision (NO) is obtained step S21, and the control flow goes to step S22 to determine whether a t1 MEASURING flag F2 is ON or not. Since this flag F2 is not initially ON, a negative decision (NO) is obtained also in step S22, and step S23 is executed to set an initial inhibit time t1 on a timer 150 of the RAM 148. Step S23 is followed by step S24 in which the t1 MEASURING flag F2 is turned ON. The initial inhibit time t1 is a predetermined suitable time after the starting of the vehicle engine. While the t1 MEASURING flag F2 is ON, the setting of the initial inhibit time t1 is prohibited until the time t1 is decremented to zero, once the time t1 has been set.

Step S24 is followed by step S25 to decrement the initial inhibit time t1, and the control flow goes to step S26 to determine whether the initial inhibit time t1 has been decremented to zero. In the first control cycle of the execution of the initial inhibit time measuring sub-routine, a negative decision (NO) is obtained in step S26, and the first control cycle is terminated. In the second control cycle, an affirmative decision (YES) is obtained in step S22, and the control flow goes to step S25, skipping steps S23 and S24. In step S25, the initial inhibit time t1 is again decremented. Thus, the preset initial inhibit time t1 is measured. Upon elapse of the time t1, an affirmative decision (YES) is obtained in step S26, and step S27 is implemented to turn ON the INITIAL INHIBIT TIME flag F1 and turn OFF the t1 MEASURING flag F2.

Figure 8B:
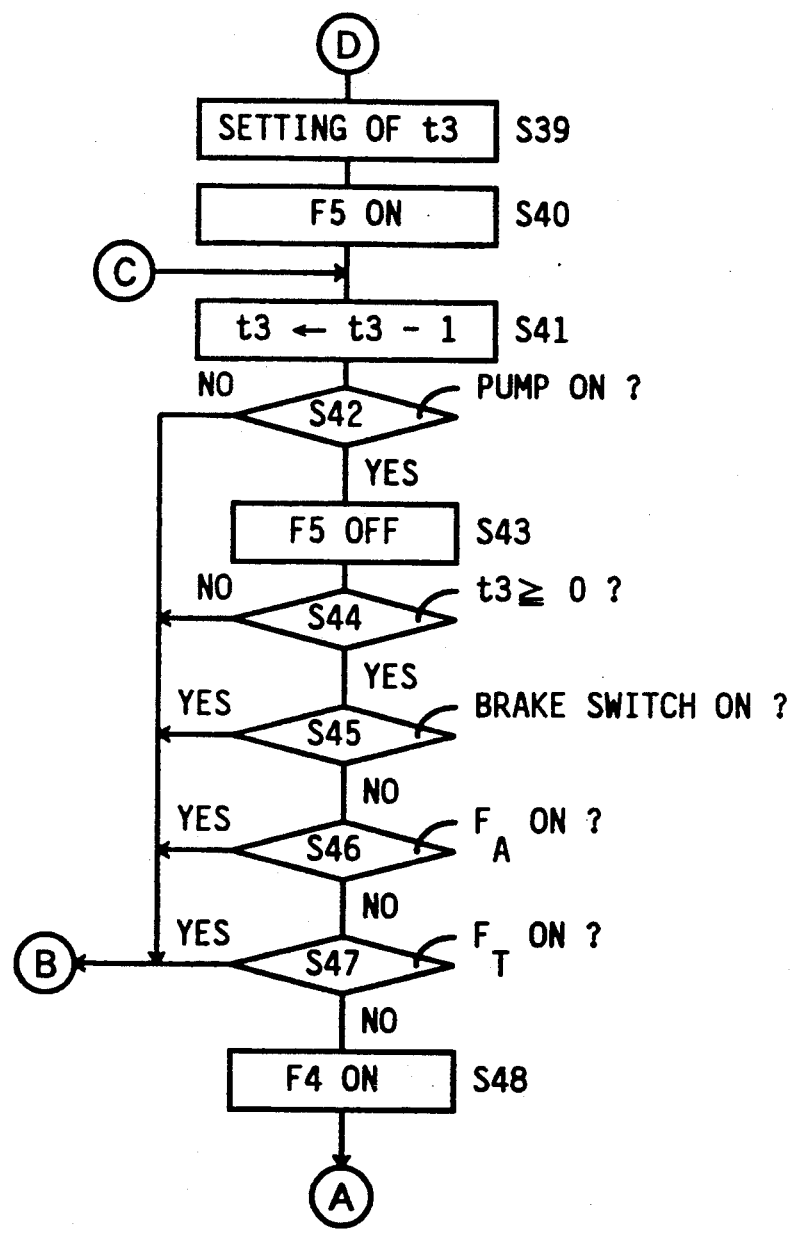
Figure 8C:
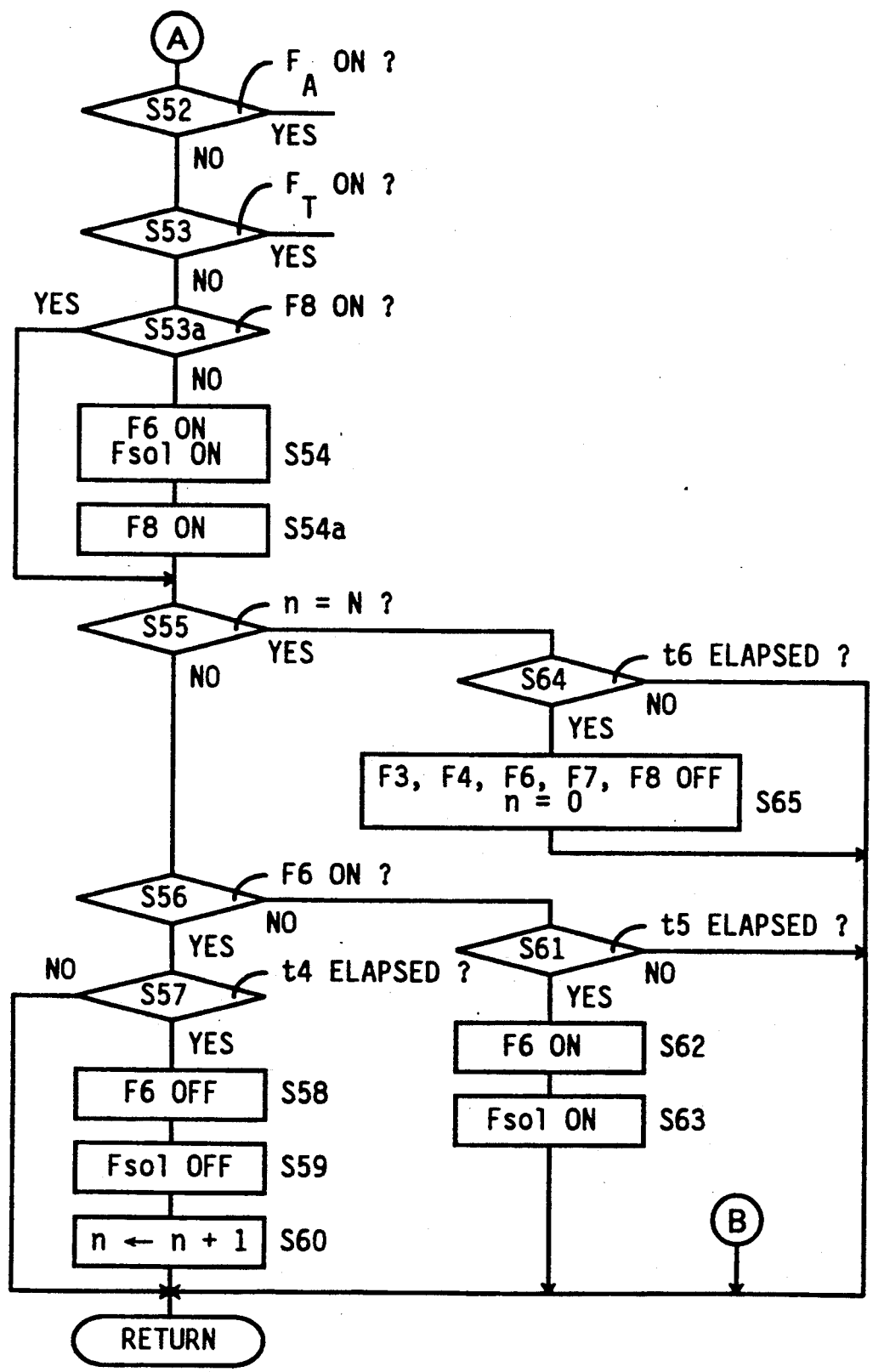

The leakage detection/elimination sub-routine of step S3 of the main routine of FIG. 5 is implement as illustrated in the flow chart of FIGS. 8A, 8B and 8C, and consists of a leakage detecting operation in steps S28-S50 (FIGS. 8A and 8B) for detecting the leakage of the accumulator 64, and a valve reciprocating operation in steps S52-S65 (FIG. 8C) for operating the directional control valve 58 to eliminate the source of the leakage.

The leakage detecting operation consists of the following three determinations for detecting the fluid leakage from the accumulator 64:

1) determination in steps S28 and S33-S36, as to whether the pump 122 continues to operate even after the pump 122 has operated for a predetermined reference operation time t2 which is sufficient for the pressure, in the accumulator 64 to be raised to the upper limit of the optimum range, in the absence of any significant fluid leakage from the accumulator 64;

2) determination in steps S29, S32, S33 and S39-S48, as to whether the pump 122 is operated within a predetermined reference pump non-operation time t3 after the last operation of the pump, which time t3 is determined such that the accumulator pressure will not be lowered below the lower limit of the optimum range during that time t3, in the absence of any significant fluid leakage from the accumulator 64; and 3) determination in steps S30, S31, S49 and S50, as to whether the output signal of the pressure switch 132 represents an abnormal drop of the accumulator pressure.

More specifically, the fluid leakage from the accumulator 64 is detected when the following condition or conditions under items i), ii) and iii) is/are satisfied with respect to the above determinations 1), 2) and 3), respectively:

(i) The pump 122 continues to operate after the reference pump operation time t2 has elapsed.

(ii) The pump 122 is operated within the reference pump non-operation time t3;
The brake switch 100 is OFF;
The brake system is not engaged in the anti-lock brake pressure regulating operation; and
The brake system is not engaged in the wheel traction control operation.

(iii) The pressure switch 132 is OFF;
The initial inhibit time t1 has elapsed after the engine ignition switch has been turned ON; and
A predetermined time t6 has elapsed after the valve reciprocating operation in steps S52-S65.

Figure 10:
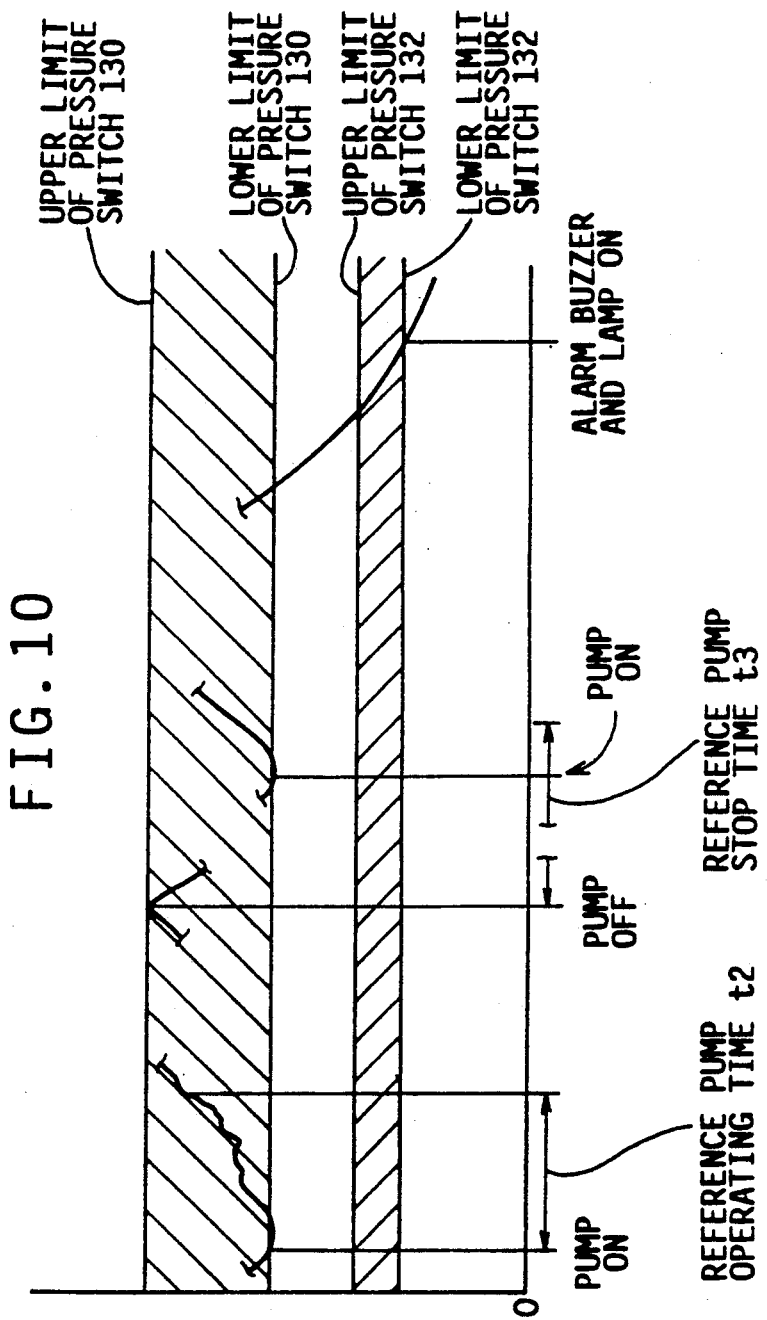
FIG. 10 is a graph showing a change in the fluid pressure in the accumulator.

The operation to determine whether the condition (i) is satisfied or not will be described. Initially, steps S28, S29 and S30 are executed to determine whether LEAKAGE DETECTION flags F3, F4 and F7 are ON or not, respectively. Since these flags (which will be described) are initially OFF, a negative decision (NO) is obtained in each of the three steps S28-S30, and the control flow goes to step S31 to determine whether the alarm buzzer 134 and alarm lamp 136 are ON, with the pressure switch 132 generating an OFF signal which indicates that the accumulator pressure is lower than the lower limit of the hysteresis of the switch 132, as indicated at the right-hand side end of the graph of FIG. 10.

Where the vehicle is adapted such that the accumulator 64 stores a pressurized fluid even when the engine is at rest, a negative decision (NO) is usually obtained in step S31, and the control flow goes to step S32 to determine whether a t3 MEASURING flag F5 is ON or not. In the first control cycle, a negative decision (NO) is obtained in step S32, and step S33 is implemented to determine whether the pump 122 is operating or not, namely, whether the pump motor 120 is ON or not. If the motor 120 is currently ON, an affirmative decision (YES) is obtained in step S33, and step S34 is implemented to determine whether the reference pump operation time t2 has elapsed after the activation of the pump 122 (after the energization of the motor 120). As indicated above with respect to the determination 1, the reference time t2 is determined such that the accumulator pressure has been elevated to the upper limit of the optimum pressure range of the accumulator 64, after the operation of the motor 120 for the reference time t2, if there is no significant amount of leakage of the fluid from the accumulator 64. The time t2 is determined depending upon the capacity of the accumulator 64, operating temperature of the fluid, and delivery of the pump 122, and with considerations given to the operating condition of the brake system wherein the traction control or anti-lock brake pressure regulating operation takes place during activation of the pump 122 to raise the accumulator pressure. The determination in step S34 is effected in the same manner as the determination on the initial inhibit time t1 in the initial inhibit time measuring sub-routine of FIG. 7.

Normally, the pump 122 is turned OFF before the reference pump operation time t2 has passed. If the pump 122 (motor 120; is still ON even after the elapse of the reference time t2, as indicated at the left-hand side end of the graph of FIG. 10, an affirmative decision (YES) is obtained in step S34, and a negative decision (NO) is obtained in step S35 in the next control cycle, whereby the control flow goes to step S36 to turn ON the LEAKAGE DETECTION flag F3. Then, the valve reciprocating operation in steps S52-S65 will be performed. The activation of the pump 122 after the elapse of the reference time t2 means that the accumulator pressure has not yet reached the upper limit of the optimum range within the reference time t2, which in turn means that the fluid is leaking from the accumulator 64. After the LEAKAGE DETECTION flag F3 has been turned ON in step S36, an affirmative decision (YES) is obtained in step S28, whereby steps S52-S65 are repeatedly executed, with steps S29-S36 being skipped.

There will next be described the operation to determine whether the conditions (ii) are satisfied or not. If the accumulator pressure has been raised to the upper limit of the optimum range and the pump 122 turned OFF within the reference pump operation time t2, a negative decision (NO) is obtained in step S33, whereby the control flow goes to step S39 in which the predetermined reference pump non-operation time t3 is set on the timer 152. Then, the control flow goes to step S40 to turn ON the t3 MEASURING flag F5, and step S41 to decrement the timer 152. Step S42 is then executed to determine whether the pump 122 is ON or not. If a negative decision (NO) is obtained in step S42, the control flow returns to step S28 through the initial inhibit time measuring sub-routine of FIG. 7, to initiate the next control cycle, in which an affirmative decision (YES) is obtained in step S32, since the LEAKAGE DETECTION flag F5 has been turned ON in step S40 in the last control cycle. Consequently, the control flow goes to steps S41 and S42, skipping steps S39 and S40.

If the pump 122 is activated while the timer 152 is decremented, an affirmative decision (YES) is obtained in step S42, whereby step S43 is implemented to turn OFF the t3 MEASURING flag F5. The control flow then goes to step S44 to determine whether the current content of the timer 152 or the reference pump non-operation time t3 is equal to or longer than zero, or not. The reference pump non-operation time t3 is determined to be shorter than a normal non-operation or non-operation time of the pump 122 from the moment when the pump 122 is turned off with the accumulator pressure reaching the upper limit, to the moment when the pump 122 is activated again with the accumulator pressure falling below the lower limit. If the brake fluid is not leaking from the accumulator 64, therefore, the pump 122 is activated after the reference pump non-operation time t3 has elapsed, that is, the content of the timer 152 (decremented reference time t3) is a negative value (indicating that the time t3 has elapsed), whereby a negative decision (NO) is obtained in step S44 to terminate the determination 2 as to whether the conditions (ii) are satisfied or not. If a leakage flow from the accumulator 64 exists, however, the accumulator pressure falls below the lower limit of the optimum range and the pump 122 is activated before the reference non-operation time t3 has elapsed, as indicated in the middle portion of the graph of FIG. 10, the decremented reference time value t3 is larger than zero, whereby a affirmative decision (YES) is obtained in step S44. Accordingly, determinations in steps S45–S47 are implemented.

If the amount of leakage flow of the fluid from the accumulator 64 is not so large, the pump 122 is not usually activated within the reference pump non-operation time t3, and a negative decision (NO) is obtained in step S44, whereby the valve reciprocating operation in steps S52–S65 will not be performed. If a considerable amount of the brake fluid is used for effecting the anti-lock or traction control brake pressure regulating operation, however, the pump 122 may be activated within the reference time t3, even if the leakage flow amount is relatively small. In this case, the valve reciprocating operation is not necessary and should be avoided. For this purpose, steps S45–S47 are provided.

More specifically, step S45 is executed to determine whether the brake switch 100 is ON or not, and step S46 is executed to determine whether an ANTI-LOCK CONTROL flag $F_A$ is ON or not. Further, step S47 is implemented to determine whether a TRACTION CONTROL flag $F_T$ is ON or not. These flags $F_A$ and $F_T$ are ON if the anti-lock or traction control brake pressure regulating operation according to the control program stored in the ROM 146 of the control device 65 has been started. The control flow goes to step S48 to turn ON the LEAKAGE DETECTION flag F4, and execute the valve reciprocating operation in steps S52–S64, only in the case where a negative decision (NO) is obtained in all of the steps S45, S46 and S47. With the LEAKAGE DETECTION flag F4 turned ON in step S48, an affirmative decision (YES) is obtained in step S29 in the next control cycle, whereby the control flow goes to step S52, skipping steps S30–S48.

The accumulator pressure will not be lowered below the lower limit by the consumption of the brake fluid for a normal braking operation with the brake switch 100 turned ON. If the accumulator pressure is lowered below the lower limit with a slight amount of the fluid leakage from the accumulator 64 while the brake is applied to the vehicle, the LEAKAGE DETECTION flag F4 is turned ON in step S48 and the valve reciprocating operation is effected. However, this happens only infrequently, and merely requires some additional time for the valve reciprocating operation which is not practically necessary.

There will be described the operation to determine whether the conditions (iii) above are satisfied or not. The accumulator pressure is usually lower than the lower limit of the hysteresis of the pressure switch 132 as indicated at the right-hand side end of the graph of FIG. 10, for the initial inhibit time t1 after the start of the vehicle engine, if the vehicle is not adapted to store the pressurized brake fluid in the accumulator 64, or if the engine has been at rest for a considerably long time before the start of the engine even where the accumulator 64 is adapted to be depressurized when the engine is turned off. In this case, therefore, an affirmative decision (YES) is obtained in step S31, and the control flow goes to step S49 to determine whether the INITIAL INHIBIT TIME flag F1 has been turned ON or not in the initial inhibit time measuring sub-routine of FIG. 7 (step S2 in the main routine of FIG. 5), namely whether the initial inhibit time t1 has elapsed or not. If a negative decision (NO) is obtained in step S49, the control returns to the beginning of the initial inhibit time measuring sub-routine of FIG. 7, skipping steps S50 and subsequent steps. If the alarm buzzer 133 and lamp 136 are still ON even after the initial inhibit time t1 has elapsed, an affirmative decision (YES) is obtained in step S49, and step S50 is implemented to turn ON the INITIAL INHIBIT TIME flag F1. The control flow then goes to step S52 to initiate the valve reciprocating operation in the subsequent steps. The significance of the "predetermined time t6 after the valve reciprocating operation" indicated above with respect to the one of the conditions (iii) will be described later.

The valve reciprocating operation will now be described. As explained above, this operation will be performed when any one of the LEAKAGE DETECTION flags F3, F4 and F7 has been turned ON. In the valve reciprocating operation, the coil winding 58q of the solenoid-operated directional control valve 58 is alternately energized for a time t4 and de-energized for a time t5, so that the valving member 58j of the valve 58 is reciprocated N times.

Initially, steps S52 and S53 are implemented to determine whether the ANTI-LOCK CONTROL flag $F_A$ or TRACTION CONTROL flag $F_T$ is ON or not. If a negative decision (NO) is obtained in both steps S52, S53, step S53a is implemented to determine whether a VALVE RECIPROCATION flag F8 is ON or not. This flag F8 indicates that the reciprocation of the valve 58 has been commenced. Initially, a negative decision (NO) is obtained in step S53a, and the control flow goes to step S54 to turn ON a COIL ENERGIZATION flag F6 and the SOLENOID flag Fsol, and step S54a to turn ON the VALVE RECIPROCATION flag F8. If an affirmative decision (YES) is obtained in step S52 or S53, the control flow returns to the beginning of the initial inhibit time measuring sub-routine of FIG. 7, so that the valve reciprocating operation is not performed or stopped.

When the SOLENOID flag Fsol is turned ON, the coil winding 58q of the valve 58 is energized by an electric current applied thereto, whereby the valving member 58j is moved toward the shut-off valve 58f, for closing the shut-off valve 58f and opening the shut-off valve 58g on the side of the accumulator 64. Subsequently, step S55 is implemented to determine whether or not a content "n" of a counter 156 has become equal to "N", which represents the predetermined number of reciprocation of the valving member 58j for eliminating the incomplete closure of the shut-off valve 58g. Initially, a negative decision (NO) is obtained in step S55, and step S56 is executed to determine whether the COIL ENERGIZATION flag F6 is ON or not. Since an affirmative decision (YES) is obtained in step S56, step S57 is executed to set the predetermined energization time t4 on a timer 154 (only in the first execution of step S57). In the subsequent control cycles, an affirmative decision (YES) is obtained in step S53a, and the control flow goes to step S55, skipping steps S54 and S54a. In these control cycles, step S57 determines whether the time t4 has elapsed or not.

When the energization time t4 has elapsed, an afirmative decision (YES) is obtained in step S57, step S58 is executed to turn OFF the COIL ENERGIZATION flag F6, and step S59 is executed to turn OFF the SOLENOID flag Fsol to de-energize the coil winding 58q, whereby the valving member 58j is moved under the biasing action of the spring 58k to close the shut-off valve 58g. Then, the content "n" of the counter 154 is incremented, and the control flow returns to the beginning of the initial inhibit time measuring sub-routine. When the content "n" of the counter 154 has reached "N", an affirmative decision (YES) is obtained in step S55, and the control flow goes to step S64. If the content "n" is not equal to "N", step S55 is followed by step S56. Since the COIL ENERGIZATION flag F6 was turned OFF in step S58 in the last control cycle, step S56 is followed by step S61 to set the predetermined de-energization time t5 on the timer 152 (only in the first execution of step S61). In the subsequent control cycles, step S61 determines whether the time t5 has elapsed or not. When the predetermined de-energization time t5 has elapsed, step S61 is followed by steps S62 and S63 to turn ON the COIL ENERGIZATION flag F6 and the SOLENOID flag Fsol to move the valving member 58j to close the shut-off valve 58f.

Thus, the coil winding 58q of the directional control valve 58 is energized and de-energized alternately for the predetermined energization and de-energization times t4, t5, respectively, to reciprocate the valving member 58j the "N" times. As a result, the foreign matters caught in the directional control valve 58 may be washed away by the fluid supplied from the accumulator 64, or compacted or crushed between the operating end 58i and the valve seat 58m, so that the shut-off valves 58f, 58g can be placed in their nominal closed positions. If the fluid from the accumulator 64 is leaking through the incompletely closed shut-off valve 58g (more precisely, through a clearance between the valve seat 58m and the operating end 58i of the valving member 58j, due to the incomplete closure of the shut-off valve 58g), the elimination of the foreign matters from the valve 58g permits the operating end 58i to be properly seated on the valve seat 58m, thereby assuring complete closure of the valve 58g or preventing the leakage of the fluid from the accumulator 64 into the reservoir 116 through the valve 58g.

When the valving member 58j has been reciprocated the "N" number of times, an affirmative decision (YES) is obtained in step S55, the predetermined time t6 (after the valve reciprocating operation) is set on the timer 154 (only in the first execution of step S64). In the subsequent control cycles, step S64 determines whether the time t6 has elapsed or not. Immediately after the valving member 58j has been reciprocated due to the abnormal pressure drop of the accumulator 64, the accumulator pressure is still abnormally low. Therefore, if the flags F3, F4, F6, F7 and F8 are reset to the OFF state in this abnormal condition, an affirmative decision (YES) is obtained in step s31, and the valve reciprocating operation is executed again in vain. To avoid this, the predetermined suitable time t6 is allowed before execution of step S65, for the directional control valve 58 to recover the normal operating condition due to the reciprocating movements of the valving member 58j. Thus, the affirmative decision (YES) satisfies the condition that "a predetermined time t6 has elapsed after the valve reciprocating operation" indicated above as one of the conditions (iii). It is noted that LEAKAGE DETECTION flag F3 or F4 will not be turned OFF immediately after the valve reciprocating operation which was effected due to the pump operation time longer than the reference pump operation time t2 or the pump non-operation time shorter than the reference pump non-operation time t3.

When the predetermined time t6 has elapsed, step S64 is followed by step s65 to turn OFF the LEAKAGE DETECTION flags F3, F4, F7, COIL ENERGIZATION flag F6 and VALVE RECIPROCATION flag F8, and reset the counter 156 to zero (n=0). Thus, the valve reciprocating operation is terminated.

If an affirmative decision (YES) is obtained in step S31 (and also in step S49) the predetermined time t6 after the predetermined number "N" of reciprocating movements of the valving member 58j of the directional control valve 58, this means that the number "N" of reciprocating movements of the valving member 58j is not sufficient. In this case, the LEAKAGE DETECTION flag F7 is turned ON in step S50, indicating that the brake fluid is still leaking through the directional control valve 58, whereby the valve reciprocating operation is effected again.

It will be understood from the foregoing description of the present embodiment that the portions of the CPU 144, RAM 148 and ROM 146 of the control device 65 which are assigned to execute steps S28-S50 constitute means for performing an accumulator leakage detection operation for detecting a leakage flow of the fluid from the accumulator 64, while the portions of the same assigned to execute steps S52-S65 constitute means for performing a valve reciprocating operation for reciprocating the valving member 58j of the directional control valve 58 as a control valve used in the brake system. These accumulator leakage detecting means and valve reciprocating means cooperate with the pump 122, motor 120, pressure switches 130, 132 and other elements to constitute the accumulator leakage preventing device for detecting and eliminating the accumulator leakage.

Referring next to FIGS. 11-16, another embodiment of the accumulator leakage preventing device will be described. In these figures, the same reference numerals as used in the preceding embodiment will be used to identify the corresponding components, and no redundant description of these elements will be provided in the interest of brevity.

Figure 11:
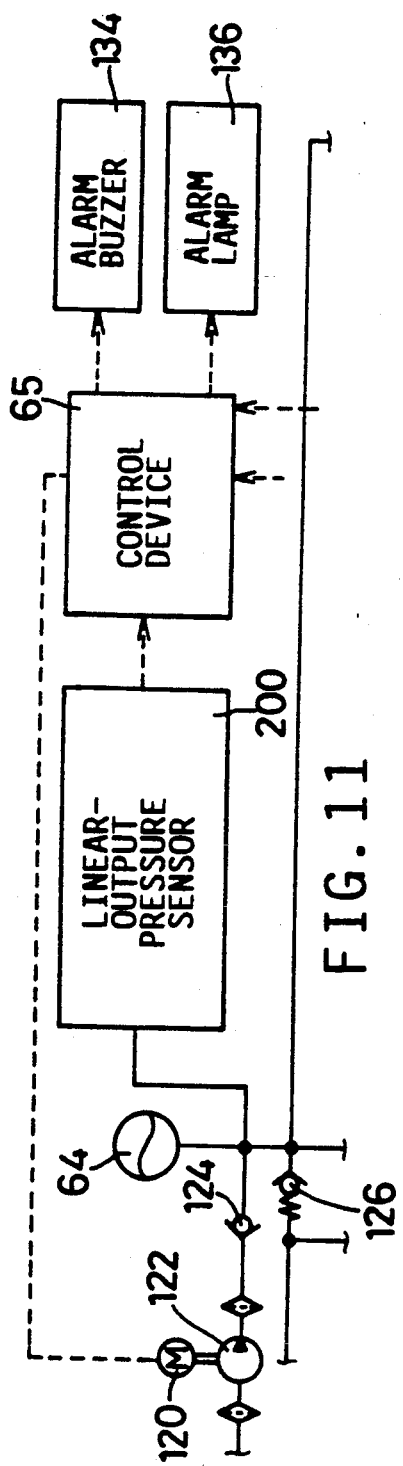
FIG. 11 is a schematic view depicting a portion of a hydraulically-operated brake system incorporating another embodiment of the accumulator leakage preventing device of the invention.
Figure 12:
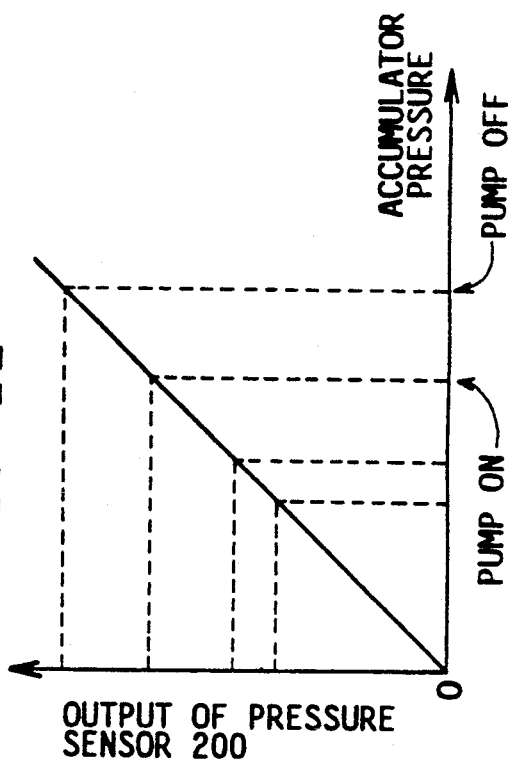
FIG. 12 is a graph indicating an operating characteristic of a linear pressure sensor used in the embodiment of FIG. 11.
Figure 13:
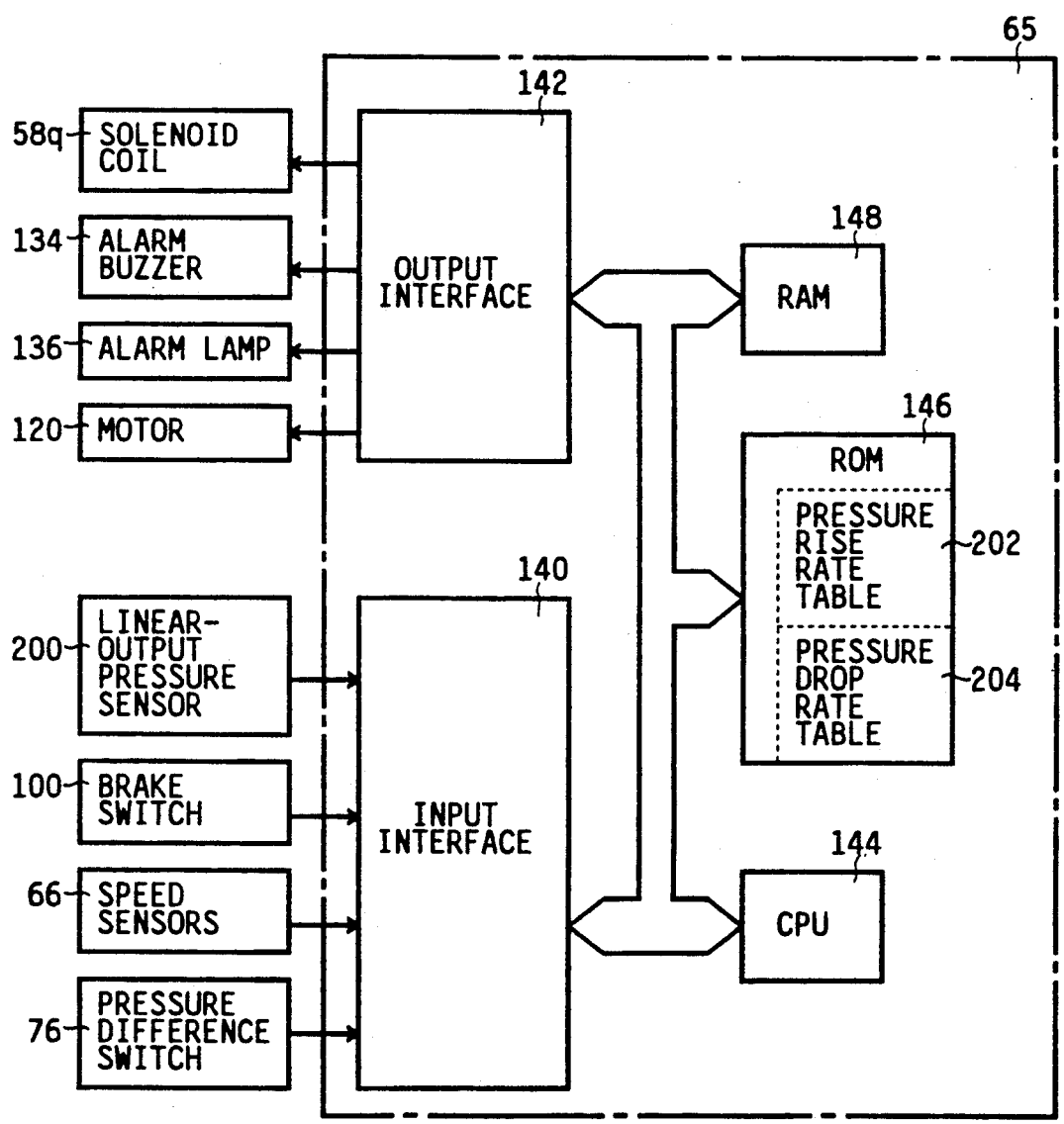
FIG. 13 is a schematic block diagram showing a control device used in the embodiment of FIG. 11.
Figure 14:
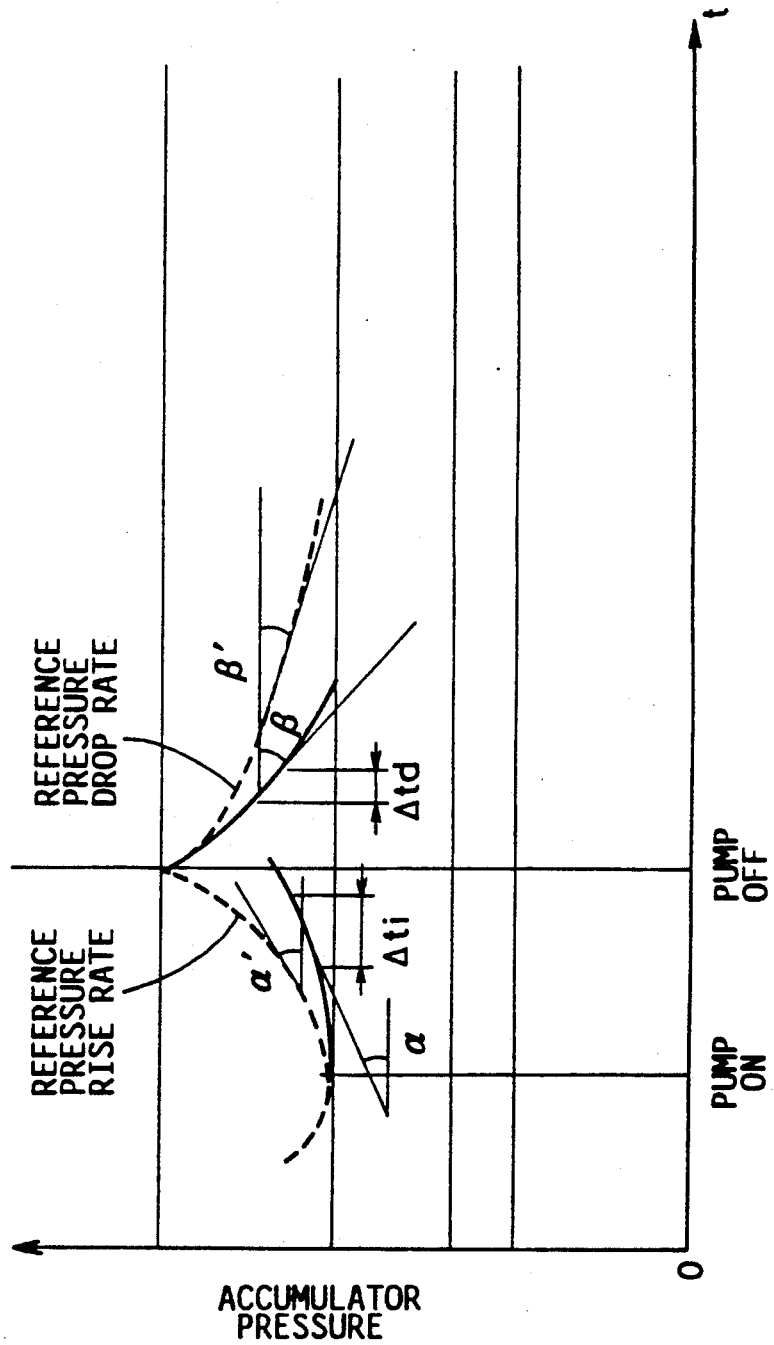
FIG. 14 is a graph explaining a data table stored in a read-only memory of the control device of FIG. 13.

In the present embodiment, a linear-output pressure sensor 200 is used, as shown in FIG. 11, in place of the pressure sensors 130, 132 used in the preceding embodiment. The linear-output pressure sensor 200 exhibits a linear relationship between its output and the accumulator pressure, as indicated in FIG. 12. By utilizing this linear relationship, therefore, the leakage flow of the brake fluid from the accumulator 64 can be detected or determined based on a PRESSURE RISE RATE table 202 and a PRESSURE DROP RATE table 204 which are provided in the ROM 146 of the control device 65, as indicated in FIG. 13. The PRESSURE RISE RATE table 202 stores data representative of a reference rise rate $\alpha'$ of the accumulator pressure a indicated in broken line in FIG. 14, in relation to different levels of the accumulator pressure, while the brake fluid is leaking through the directional control valve 58 at a relatively low rate. The reference rise rate $\alpha'$ is determined by the pressure rise characteristic of the accumulator 64 when the pump 122 is operating. On the other hand, the PRESSURE DROP RATE table 204 stores data representative of a reference pressure drop (leakage) rate $\beta'$, in relation the different levels of the accumulator pressure, while the brake fluid is slightly leaking. The reference pressure drop rate $\beta'$ is determined by the pressure drop characteristic of the accumulator 64 when the pump 122 is at rest. In the present embodiment, the RAM 248 includes various memory areas as indicated in FIG. 16.

In the present embodiment, the accumulator pressure is detected based on the output signal of the linear-output pressure sensor 200, and a rise rate $\alpha$ or drop rate $\beta$ of the accumulator pressure is calculated based on the detected accumulator pressure values. The calculated pressure rise rate $\alpha$ or pressure drop rate $\beta$ is compared with the reference pressure rise or drop rate $\alpha'$ or $\beta'$ represented by the data in the tables 202, 204, according to the leakage detection/elimination sub-routine illustrated in the flow chart of FIGS. 15A and 15B. Thus, the leakage of the brake fluid through the directional control valve 58 is detected. In the present embodiment, the linear-output pressure sensor 200 cooperates with the portions of the CPU 144, RAM 148 and ROM 146 of the control device 65 assigned to execute steps S68-S88 of the flow chart of FIGS. 15A and 15B, to constitute the leakage detecting means.

Figure 15A:
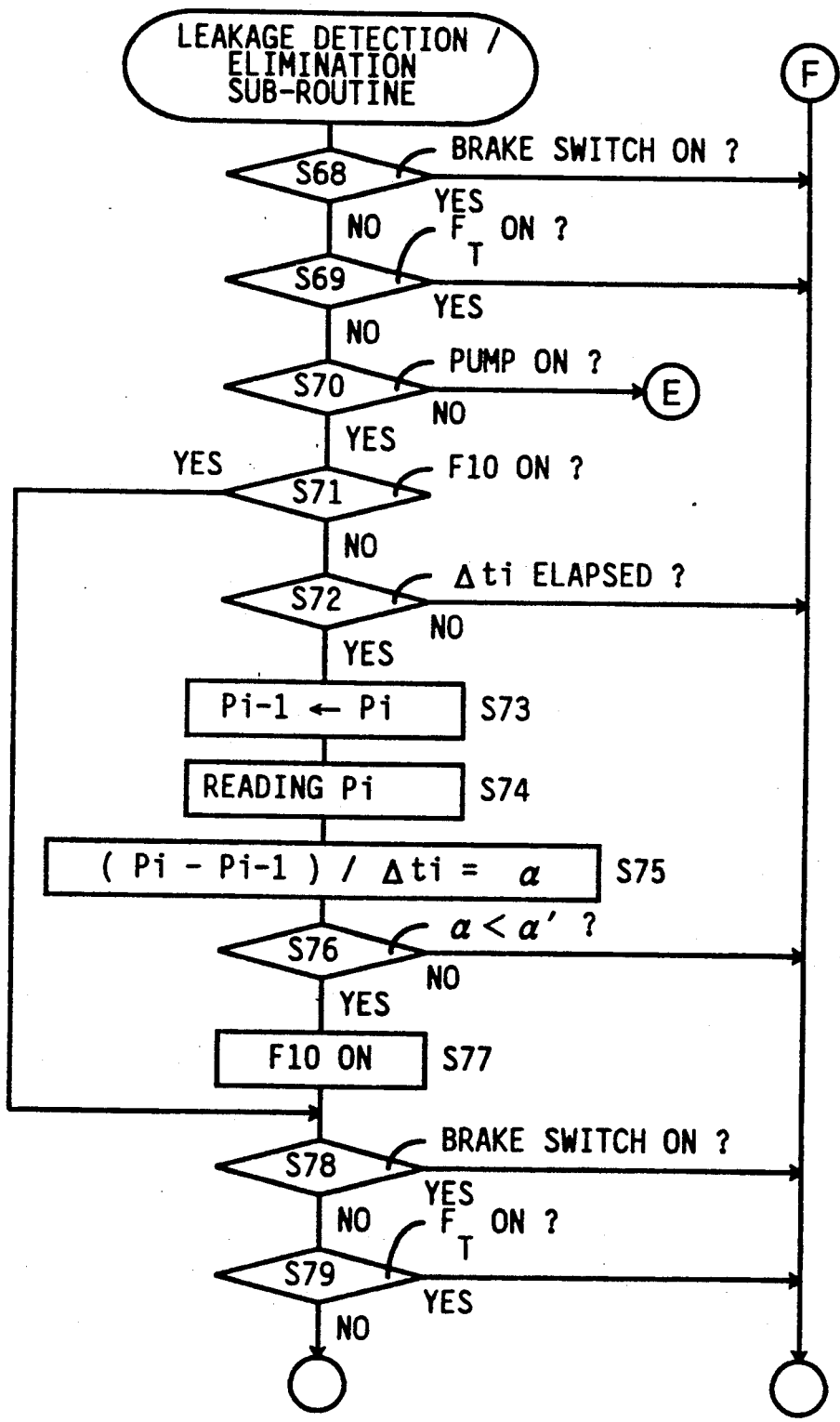
FIGS. 15A and 15B are a flow chart illustrating an accumulator leakage detection/elimination sub-routine stored in the read-only memory of the control device.
Figure 15B:
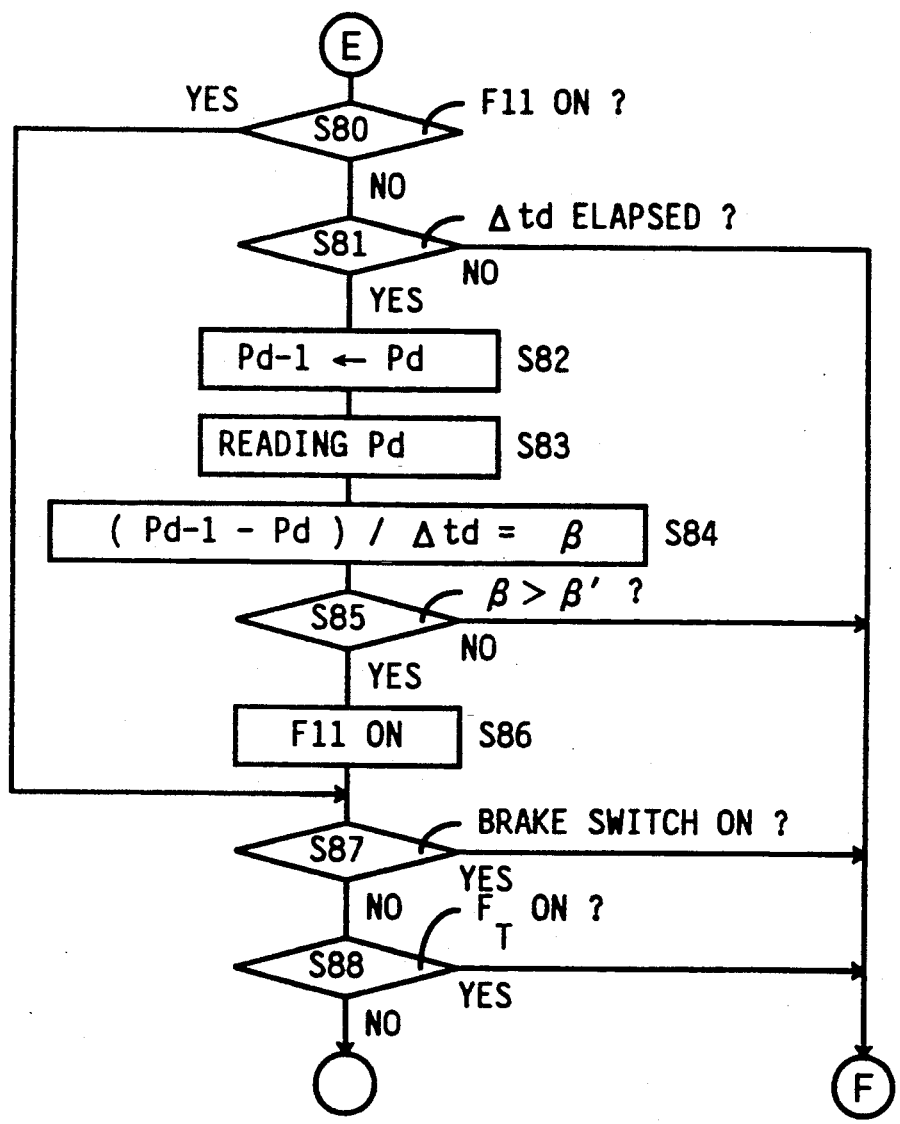

As indicated in FIG. 15A, steps S68 and S69 are initially executed to permit determinations in steps S70-S72 to be made only where the brake switch 100 is OFF and the TRACTION CONTROL flag $F_T$ is OFF, i.e., only where the brake fluid in the accumulator 64 is not consumed.

Step S69 is followed by step S70 to determine whether the pump 122 is ON or not. If an affirmative decision (YES) is obtained in step S70, step S71 is implemented to determine whether a LEAKAGE DETECTION flag F10 is ON or not. In the first control cycle, a negative decision (NO) is obtained in step s71, and the control flow goes to step s72 to determine whether a predetermined detection time $\Delta$ti has elapsed or not. The linear-output pressure sensor 200 is provided with a low-pass filter for eliminating high-frequency noises, but the noises cannot be completely eliminated by this low-pass filter. Further, the accumulator pressure tends to more or less fluctuate due to pulsation. To eliminate the influence of such noises and accumulator pressure pulsation, the time $\Delta$ti is allowed for accurately detecting the accumulator pressure rise rate. This time $\Delta$ti is longer than the cycle time of the sub-routine of the flow chart of FIGS. 15A, 15B, and 15C.

When the predetermined detection time $\Delta$ti has elapsed, step S72 is followed by step S73 in which a currently detected value Pi of the accumulator pressure stored in a CURRENT PRESSURE register 206 of the RAM 148 is stored as a last pressure value (Pi−1) in a LAST PRESSURE register 208. Step S73 is followed by step S74 in which the accumulator pressure is read as the current value Pi and stored in the CURRENT PRESSURE register 206. Then, the control flow goes to step S75 to calculate the rise rate $\alpha$ of the accumulator pressure and store the calculated rise rate $\alpha$ in a PRESSURE RISE RATE register 210 of the RAM 148. The accumulator pressure rise rate is calculated by dividing a difference between the current pressure value Pi and the last pressure value (Pi−1), by the detection time $\Delta$ti. Step S75 is followed by step S76 to determine whether the calculated rate $\alpha$ is lower than the reference rate $\alpha'$ which corresponds to the current pressure value Pi stored in the CURRENT PRESSURE register 206. This reference rate $\alpha'$ is obtained by referring to the PRESSURE RISE RATE table 202. If a negative decision (NO) is obtained in step S76, the control device 65 determines that the brake fluid is not leaking through the directional control valve 58, and the LEAKAGE DETECTION flag F10 is not turned ON. If an affirmative decision (YES) is obtained in step S76 with the calculated pressure rise rate a lower than the reference value $\alpha'$, step S76 is followed by step S77 to turn ON the LEAKAGE DETECTION flag F10. The control flow then goes to step S78 to determine whether the brake switch 100 is ON or not, and step S79 to determine whether the TRACTION CONTROL flag $F_T$ is ON or not. If a negative decision (NO) is obtained in both of these steps S78 and S79, a valve reciprocating operation as illustrated in the flow chart of FIGS. 8A, 8B and 8C is performed.

If the pump 122 is at rest, a negative decision (NO) is obtained in step S70, and the pressure drop rate $\beta$ is calculated in steps S80-S84 (FIG. 15B) similar to steps S71-S75 for the pressure rise rate $\alpha$ described above. Then, step S85 is implemented to determine whether the calculated pressure drop rate $\beta$ is higher than the reference drop rate $\beta'$ obtained from the PRESSURE DROP RATE table 204. If the calculated rate $\beta$ is lower than the reference value $\beta'$, a LEAKAGE DETECTION flag F11 is not turned ON. If the calculated rate $\beta$ is higher than the reference value $\beta'$, an affirmative decision (YES) is obtained in step S85, and the LEAKAGE DETECTION flag F11 is turned ON, and the valve reciprocating operation is performed if a negative decision (NO) is obtained in both of the following steps S87 and S88.

While the two embodiments have been described, the present invention may be embodied such that the leakage detecting operation consists of the following three determinations for detecting the fluid leakage from the accumulator 64:

a) determination as to whether the pump 122 continues to operate even after the pump 122 has operated for a predetermined operation time $t_{10}$ (e.g., 240 seconds) which is sufficient for the pressure in the accumulator 64 to be raised to the upper limit of the optimum range, in the absence of any significant fluid leakage from the accumulator 64;

b) determination as to whether the pressure in the accumulator 64 has been lowered below the lower limit of the optimum range, even while the ignition switch of the vehicle engine is held ON, after the accumulator pressure was once raised to the upper limit of the optimum range; and c) determination as to whether the accumulator pressure will not be raised to the upper limit of the optimum range even after the ignition switch has been turned ON.

More specifically, a fluid leakage is detected when any one of the following conditions corresponding to the above determinations (a), (b) and (c) is satisfied before the leakage detecting operation and after completion of the valve reciprocating operation:

(i) The pump 122 continues to operate after the reference pump operation time $t_{10}$.

(ii) The pressure switch 132 is OFF; and
The pressure switch 132 experienced an ON state.

(iii) The pressure switch 132 is OFF; and
An initial inhibit time $t_{11}$ (e.g., 80 seconds) has passed after the ignition switch was turned ON.

The condition "the pressure switch 132 experienced an ON state" is satisfied after the pressure switch 132 is held ON for a predetermined time $t_{12}$ (e.g., 9 seconds). This condition is reset if the ignition switch is turned OFF, and is not established until the pressure switch 132 is again held ON for the predetermined time $t_{12}$.

If any one of the above conditions (i), (ii) and (iii) is satisfied, the valve reciprocating operation is initiated, after it is detected that the brake system is not in the anti-lock or traction control mode, and after a diagnostic routine performed by the control device 65 indicates there is no serious abnormality such as a defect in the coil winding 58q of the directional control valve 58.

The illustrated embodiments described above may be adapted such that the control device 65 stores data indicative of the number of the valve reciprocating operations which have been performed after the activation of the ignition switch and until the de-activation thereof, so that an alarm is given to the vehicle operator when the number of the valve reciprocating operations performed exceeds a predetermined number.

It is possible that the diagnostic routine indicated above may incorporate the accumulator leakage preventing routine according to the present invention.

While the present invention has been described in its presently preferred embodiments adapted to detect and eliminate the leakage of the brake fluid from the accumulator 64 through the solenoid-operated directional control valve 58, the present invention is equally applicable to any leakage preventing device for detecting and eliminating a leakage flow of a hydraulic fluid through any other control valve used in any hydraulically-operated system which has the control valve, a hydraulic accumulator, and an actuator operated by the pressurized fluid stored in the accumulator.

It is to be understood that the present invention may be embodied with other changes, modifications and improvements, which may occur to those skilled in the art, in view of the foregoing teachings.

What is claimed is:

1. A fluid leakage preventing device incorporated in a hydraulically-operated system which includes an accumulator for storing a fluid under pressure, an actuator operated by the fluid supplied from the accumulator, and a control valve having an open position and a closed position for fluid communication and disconnection between the accumulator and the actuator, respectively, said fluid leakage preventing device preventing a leakage flow of the fluid from the accumulator through the control valve placed in said closed position, said fluid leakage preventing device comprising:

a fluid leakage detecting means for detecting leakage of fluid from said accumulator, and for generating an output signal indicative thereof; and a valve reciprocating means responsive to said output signal, for removing a cause of leakage flow from said accumulator by initiating at least one reciprocating movement of a valving member of said control valve.

2. A fluid leakage preventing device according to claim 1, wherein said hydraulically-operated system further includes pressurizing means for raising a pressure of said fluid stored in said accumulator to a predetermined level, and said fluid leakage detecting means is affected by an operation of said pressurizing means.

3. A fluid leakage preventing device according to claim 2, wherein said fluid leakage detecting means detects said leakage flow, when said pressurizing means continues to operate after a predetermined reference operation time has elapsed after commencement of said operation of said pressurizing means.

4. A fluid leakage preventing device according to claim 2, wherein said fluid leakage detecting means detects said leakage flow, when said pressurizing means is off during a predetermined reference non-operation time after raising of said pressure of the fluid to said predetermined level.

5. A fluid leakage preventing device according to claim 2, wherein said pressurizing means comprises:

an accumulator storage pressure switch for detecting an upper and a lower limit of an optimum range of the pressure of said fluid stored in said accumulator, and for generating an output signal;

a motor operated in response to said output signal of said accumulator storage pressure switch; and a pump driven by said motor to raise the pressure of said fluid stored in said accumulator.

6. A fluid leakage preventing device according to claim 1, wherein said fluid leakage detecting means further comprises a pressure drop detecting means for detecting an abnormal drop of the pressure of said fluid stored in said accumulator, and said fluid leakage detecting means detects said leakage flow of said fluid from said accumulator when said pressure drop detecting means detects said abnormal drop.

7. A fluid leakage preventing device according to claim 6, wherein said pressure drop detecting means includes an accumulator alarm pressure switch for detecting the pressure of said fluid stored in said accumulator.

8. A fluid leakage preventing device according to claim 1, wherein said hydraulically-operated system further comprises:

a pressurizing means for raising a pressure of said fluid stored in said accumulator to a predetermined level; and a pressure detecting means for detecting a pressure of said fluid stored in said accumulator, wherein said leakage fluid detecting means detects said leakage flow based on the pressure of said fluid stored in said accumulator which is detected by said pressure detecting means.

9. A fluid leakage preventing device according to claim 8, wherein said pressurizing means comprises:

a motor operated in response to an output signal of said pressure detecting means; and a pump driven by said motor to raise the pressure of said fluid stored in said accumulator.

10. A fluid leakage preventing device according to claim 8, wherein said fluid leakage detecting means detects said leakage flow based on a first comparison between a rise rate of the pressure of said fluid detected by said pressure detecting means while said pressure is raised by said pressurizing means, and a predetermined reference rise rate, and a second comparison between a drop rate of the pressure of said fluid detected by said pressure detecting means while said pressurizing means is disengaged, and a predetermined reference drop rate.

11. A fluid leakage preventing device according to claim 10, wherein said valve reciprocating means is controlled by a control device including a computer which includes a memory storing a pressure rise table and a pressure drop table, said pressure rise table including data representative of a relationship between a reference rise rate and the pressure of said fluid detected by said pressure detecting means, and said pressure drop table including data representative of a relationship between a reference drop rate and the pressure of said fluid detected by said pressure detecting means.

12. A fluid leakage preventing device according to claim 8, wherein said pressure detecting means comprises a linear-output pressure sensor which generates an electrical output which is linearly proportional to the pressure of said fluid stored in said accumulator.

13. A fluid leakage preventing device according to claim 1, wherein said control valve comprises:
  a shut-off valve having said valving member, and
  a valve seat on which said shut-off valve is seated, wherein said shut-off valve is coupled to said valve seat for disconnecting said accumulator from said actuator when said control valve is placed in said closed position, and said shut-off valve is separated from said valve seat when said control valve is placed in said open position.

14. A fluid leakage preventing device according to claim 1, wherein said fluid leakage detecting means is prevented from detecting said leakage flow for a predetermined time after at least one reciprocating movement of said valving member of said control valve.

15. A fluid leakage preventing device according to claim 1, wherein said valve reciprocating means repeats said reciprocating movement of said valving member until said leakage flow is eliminated.

16. A hydraulically-operated brake system for a vehicle, including a brake operating member, a hydraulic power source for generating a first hydraulic pressure in response to an operation of said brake operating member, an accumulator for storing a second hydraulic pressure, a wheel brake cylinder operated selectively by said first and second hydraulic pressures to apply a brake to a wheel of said vehicle, and a control valve through which said first and second hydraulic pressures are selectively applied to said wheel brake cylinder, said hydraulically-operated brake system comprising:
  a fluid leakage detection means for detecting leakage of fluid from said accumulator, and for generating an output signal indicative thereof; and
  a valve reciprocating means responsive to said output signal, for removing a cause of leakage flow from said accumulator by initiating at least one reciprocating movement of a valving member of said control valve.

17. A hydraulically-operated brake system according to claim 16, wherein said hydraulic power source includes a hydraulic booster for boosting an operating force acting on said brake operating member to produce said first hydraulic pressure, said accumulator serving as a hydraulic pressure source to store said second hydraulic pressure for said hydraulic booster.

18. A hydraulically-operated brake system according to claim 16, wherein said brake system uses said second hydraulic pressure for applying said brake to said wheel in at least one of an anti-lock mode so as to maintain a slip of said wheel within an optimum range while said brake operating member is operated, and a traction control mode so as to control a drive force of said wheel for maintaining the slip of the wheel within an optimum range while said wheel is accelerated.

19. A hydraulically-operated brake system according to claim 18, wherein said control valve consists of a solenoid-operated directional control valve including a pair of shut-off valves having respective valving members and respective valve seats, said valve seats cooperate with said valving members to permit and inhibit flows of said fluid through said pair of said shut-off valves, a first shut-off valve of said pair of shut-off valves being disposed between said wheel brake cylinder and said accumulator, a second shut-off valve of said pair of shut-off valves being disposed between said accumulator and a power chamber of said hydraulic booster, said first shut-off valve being operated for fluid communication between said brake wheel cylinder and said accumulator in said traction control mode, and said second shut-off valve being operated for fluid communication between said wheel brake cylinder and said power chamber in said anti-lock mode.

20. A hydraulically-operated brake system according to claim 19, wherein said valve reciprocating means reciprocates said valving members of said directional control valve a predetermined number of times to open and close said pair of shut-off valves.

21. A hydraulically-operated brake system according to claim 18, wherein said brake system further includes a pressurizing means for raising a pressure of said fluid stored in said accumulator to a predetermined level, said fluid leakage detecting means detects said leakage flow when said pressurizing means is off during a predetermined reference non-operation time after raising of said pressure of the fluid to said predetermined level, while said brake operating member is at rest and while said anti-lock mode and said traction control mode are disengaged.

22. A hydraulically-operated brake system according to claim 18, wherein said valve reciprocating means includes means for stopping said at least one reciprocating movement of said valving member when one of said anti-lock mode and traction control mode of operation of said brake system is engaged.

23. A hydraulically-operated brake system according to claim 18, wherein said hydraulically-operated brake system includes a pressurizing means for raising a pressure of said fluid stored in said accumulator to a predetermined level, said fluid leakage detecting means detects said leakage flow when said pressurizing means continues to operate after a predetermined reference operation time has elapsed after commencement of operation of said pressurizing means, said predetermined reference operation time being determined depending upon a capacity of said accumulator and a delivery of said pressurizing means.

24. A hydraulically-operated brake system according to claim 16, wherein said fluid leakage detecting means detects said leakage flow when a predetermined initial inhibit time has elapsed after operation of an engine ignition switch of said vehicle.

25. A hydraulically-operated system including an accumulator for storing a fluid under pressure, a pressurizing means for raising a pressure of said fluid stored in said accumulator, and an actuator operated by the fluid supplied from said accumulator, said hydraulically-operated system comprising:

a fluid leakage detecting means for detecting a leakage of the fluid from said accumulator by detecting whether an operation time of said pressurizing means is longer than a first predetermined reference time which is sufficient for said pressurizing means to raise the pressure in said accumulator to a predetermined normal level if there is an absence of leakage of the fluid from said accumulator, whether a non-operation time of said pressurizing means is shorter than a second predetermined reference time which is determined such that the pressure of the fluid in said accumulator will not be abnormally lowered during said second predetermined reference time if there is an absence of leakage in said fluid from said accumulator, and whether there is an abnormal drop after a third predetermined time commencing after an action to remove a cause of leakage flow is performed, said third predetermined time being sufficient for a rise of the pressure of the fluid in said accumulator to said predetermined normal level.

26. A hydraulically-operated system according to claim 25, wherein said pressurizing means comprises:

a pressure detecting means for detecting the pressure of said fluid stored in said accumulator and for generating an output signal;

a motor operated according to said output signal of said pressure detecting means; and a pump driven by said motor to raise the pressure of said fluid stored in said accumulator.

27. A hydraulically-operated system including an accumulator for storing a fluid under pressure, a pressurizing means for raising a pressure of said fluid stored in said accumulator, and an actuator operated by said fluid supplied from said accumulator, said hydraulically-operated system comprising:

a fluid leakage detecting means for detecting leakage of the fluid from said accumulator, said fluid leakage detecting means includes a pressure drop detecting means for detecting an abnormal drop of the pressure of the fluid in said accumulator below a predetermined lower limit, said fluid leakage detecting means detects said leakage of the fluid when said pressure drop detecting means detects said abnormal drop after a predetermined time that an action to remove a cause of leakage flow is performed, said predetermined time being sufficient for a rise of the pressure of the fluid in said accumulator to a predetermined normal level.

28. A hydraulically-operated system according to claim 27, further comprising:

a control valve between said accumulator and said actuator, said control valve has an open position for said fluid to pass and a closed position to stop the fluid; and a valve reciprocating means responsive to said fluid leakage detecting means, for removing a cause of leakage flow from said accumulator by initiating at least one reciprocating movement of a valving member of said control valve.

* * * * *